(12) United States Patent
Taylor

(10) Patent No.: US 9,898,686 B2
(45) Date of Patent: Feb. 20, 2018

(54) OBJECT RE-IDENTIFICATION USING SELF-DISSIMILARITY

(71) Applicant: CANON KABUSHIKI KAISHA, Tokyo (JP)

(72) Inventor: Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 14/973,357

(22) Filed: Dec. 17, 2015

(65) Prior Publication Data

US 2016/0180196 A1 Jun. 23, 2016

(30) Foreign Application Priority Data

Dec. 22, 2014 (AU) ................... 2014277853

(51) Int. Cl.
*G06K 9/00* (2006.01)
*G06K 9/62* (2006.01)
*G06K 9/46* (2006.01)

(52) U.S. Cl.
CPC ....... *G06K 9/6215* (2013.01); *G06K 9/00771* (2013.01); *G06K 9/4642* (2013.01)

(58) Field of Classification Search
None
See application file for complete search history.

(56) References Cited

U.S. PATENT DOCUMENTS

| 5,487,116 | A | 1/1996 | Nakano et al. |
| 6,166,745 | A | 12/2000 | Saito |
| 8,045,759 | B2 | 10/2011 | Mizutani et al. |
| 8,340,378 | B2 | 12/2012 | Knapp et al. |
| 8,565,482 | B2 | 10/2013 | Ding et al. |
| 2007/0058879 | A1 | 3/2007 | Cutler et al. |
| 2007/0201728 | A1 | 8/2007 | Monro |
| 2009/0066490 | A1 | 3/2009 | Mitzutani et al. |
| 2009/0141940 | A1* | 6/2009 | Zhao .................. G06K 9/00295 382/103 |

(Continued)

FOREIGN PATENT DOCUMENTS

AU 2011265494 A1 7/2013

OTHER PUBLICATIONS

Exloiting dissimilarity representations for person re-identification, by Satta et al, pp. 275-289, 2011.*

(Continued)

*Primary Examiner* — Vikkram Bali
(74) *Attorney, Agent, or Firm* — Canon USA, Inc. I.P. Division

(57) ABSTRACT

A method of identifying an object in an image is disclosed. At least one feature map for each of a plurality of cells in the image is determined. A self-dissimilarity between a first feature map associated with a first one of said cells and a second feature map associated with a second cell, is determined. The self-dissimilarity is determined by determining a sum over thresholds of a difference in area between the first feature map and the second feature map. An appearance signature for the object is formed based on the determined self-dissimilarity. A distance between the appearance signature of the object in the image and appearance signatures of each of a plurality of further objects is determined. The object in the image is identified based on the determined distances.

20 Claims, 20 Drawing Sheets

(56) References Cited

U.S. PATENT DOCUMENTS

2010/0104158 A1 4/2010 Shechtman et al.
2015/0339527 A1* 11/2015 Plummer ............ G06K 9/00845
  348/78
2016/0180547 A1 6/2016 Pham et al.

OTHER PUBLICATIONS

Koestinger, et al., "Large Scale Metric Learning from Equivalence Constraints", In Computer Vision and Pattern Recognition (CVPR), 2012 IEEE Conference on, pp. 2288-2295, IEEE, 2012.
Mazzon, et al., "Person re-identification in crowd", Pattern Recognition Letters 33, No. 14, pp. 1828-1837, 2012.
Weinberger, et al.,"Distance Metric Learning for Large Margin Nearest Neighbor Classification", In Advances in Neural Information Processing Systems, pp. 1473-1480, 2005.
Yang, et al., "Local Difference Binary for Ultra-fast and Distinctive Feature Description", Pattern Analysis and Machine Intelligence, IEEE Transactions on 36, No. 1, pp. 188-194, 2014.
Gabor filter, From Wikipedia, the free encyclopedia, https://en.wikipedia.org/wiki/Gabor_filter, last modified on Oct. 19, 2015.
Convolution, From Wikipedia, the free encyclopedia, https://en.wikipedia.org/wiki/Convolution_kernel#Fast_convolution_algorithms, last modified on Dec. 7, 2015.
Hue, From Wikipedia, the free encyclopedia, https://en.wikipedia.org/wiki/Hue, last modified on Nov. 26, 2015.
Frequency (statistics), From Wikipedia, the free encyclopedia, https://en.wikipedia.org/wiki/Frequency_(statistics), last modified on Jul. 23, 2015.
Kernel density estimation, From Wikipedia, the free encyclopedia, https://en.wikipedia.org/wiki/kernel_density_estimation, last modified on Nov. 30, 2015.
Mixture model, From Wikipedia, the free encyclopedia, https://en.wikipedia.org/wiki/Mixture_model#Gaussian_mixture_model, last modified on Nov. 13, 2015.
Earth mover's distance, From Wikipedia, the free encyclopedia, https://en.wikipedia.org/wiki/Earth_mover's_distance, last modified on Nov. 6, 2015.
Thresholding (image processing), From Wikipedia, the free encyclopedia, https://en.wikipedia.org/wiki/Thresholding_(image_processing), last modified on Nov. 17, 2015.
Heaviside step function, From Wikipedia, the free encyclopedia, https://en.wikipedia.org/wiki/Heaviside_step_function, last modified on Nov. 23, 2015.
Mahalanobis distance, From Wikipedia, the free encyclopedia, https://en.wikipedia.org/wiki/Mahalanobis_distance, last modified on Nov. 9, 2015.
Principal component analysis, From Wikipedia, the free encyclopedia, https://en.wikipedia.org/wiki/Principal_component_analysis, last modified on Dec. 7, 2015.
Image segmentation, From Wikipedia, the free encyclopedia, https://en.wikipedia.org/wiki/Image_segmentation, last modified on Nov. 19, 2015.
Jack's Basement Insulation Info, http://www.pedestrian-detection.com/, Jack's Basement Insulation Info, 2015.
Euclidean distance, From Wikipedia, the free encyclopedia, https://en.wikipedia.org/wiki/Euclidean_distance, last modified on Sep. 8, 2015.
Taxicab geometry, From Wikipedia, the free encyclopedia, http://en.wikipedia.org/wiki/Manhattan_distance (also located at https://en.wikipedia.org/wiki/Taxicab_geometry), last modified on Aug. 21, 2015.
Nonlinear dimensionality reduction, From Wikipedia, the free encyclopedia, https://en.wikipedia.org/wiki/Nonlinear_dimensionality_reduction#Locally-linear_embedding, last modified on Nov. 14, 2015.
Farenzena,et al., "Person Re-Identification by Symmetry-Driven Accumulation of Local Features", In Computer Vision and Pattern Recognition (CVPR), 2010 IEEE Conference on, pp. 2360-2367, IEEE, 2010.
Cheng, et al., "Person Re-identification by Articulated Appearance Matching", In Person Re-Identification, pp. 139-160, Springer London, 2014.
"Cross-correlation", From Wikipedia, the free encyclopedia, https://en.wikipedia.org/wiki/Cross-correlation, last modified on Nov. 9, 2015.
"Dynamic programming", From Wikipedia, the free encyclopedia, https://en.wikipedia.org/wiki/Dynamic_programming, last modified on Nov. 24, 2015.
"Image gradient", From Wikipedia, the free encyclopedia, https://en.wikipedia.org/wiki/Dynamic_programming, last modified on Oct. 29, 2015.

* cited by examiner

Cost Map

Parent Map

OBJECT RE-IDENTIFICATION USING SELF-DISSIMILARITY

REFERENCE TO RELATED PATENT APPLICATION(S)

This application claims the benefit under 35 U.S.C. § 119 of the filing date of Australian Patent Application No. 2014277853, filed 22 Dec. 2014, which is hereby incorporated by reference in its entirety as if fully set forth herein.

TECHNICAL FIELD

The present description relates generally to image processing and, in particular, to a method, system and apparatus for identifying an object in an image. The present description also relates to a computer program product including a computer readable medium having recorded thereon a computer program for identifying an object in an image.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits.

A task in video surveillance is rapid and robust object matching across multiple camera views. In one example, called "hand-off", object matching is applied to persistently track multiple objects across a first and second camera with overlapping fields of view. In another example, called "re-identification", object matching is applied to locate a specific object of interest across multiple cameras in a network with non-overlapping fields of view. In the following discussion, the term "object matching" will be understood to refer to "hand-off", "re-identification", "object identification" and "object recognition".

Robust object matching is difficult for several reasons. Firstly, many objects may have similar appearance, such as a crowd of commuters on public transport wearing similar business attire. Furthermore, the viewpoint (i.e. the orientation and distance of an object in the field of view of a camera) can vary significantly between cameras in the network. Finally, lighting, shadows and other photometric properties including focus, contrast, brightness and white balance can vary significantly between cameras and locations. In one example, a single network may simultaneously include outdoor cameras viewing objects in bright daylight, and indoor cameras viewing objects under artificial lighting. Photometric variations may be exacerbated when cameras are configured to use automatic focus, gain, exposure and white balance settings.

One object matching method extracts an "appearance signature" for each object and uses the model to determine a similarity between different objects. Throughout this description, the term "appearance signature" refers to a set of values summarizing the appearance of an object or region of an image, and will be understood to include within its scope the terms "appearance model", "feature descriptor" and "feature vector".

One method of appearance-based object re-identification models the appearance of an object as a vector of low-level features based on colour, texture and shape. The features are extracted from an exemplary image of the object in a vertical region around the head and shoulders of the object. Re-identification is based in part on determining an appearance dissimilarity score based on the 'Bhattacharyya distance' between feature vectors extracted from images of candidate objects and the object of interest. The object of interest is matched to a candidate with the lowest dissimilarity score. However, the appearance dissimilarity may be large for the same object viewed under different photometric conditions.

In one method for appearance matching under photometric variations, a region of interest in an image is divided into a grid of cells, and the average intensity, horizontal intensity gradient and vertical intensity gradient are determined over all pixels in each cell. For each pair of cells, binary tests are performed to determine which cell has greater average intensity and gradients. The test results over all cell pairs are concatenated into a binary string that represents the appearance signature of the image region. A region of interest is compared to a candidate region by determining the Hamming distance between respective appearance signatures of the regions. However, the average intensity and gradients are not very descriptive of the distribution of pixels values within a region. Further, binary differences are sensitive to noise in homogeneous regions, and do not characterize the magnitude of the difference between pairs of regions.

Another method for appearance matching under photometric variations relies in part on determining self-similarity. In this self-similarity method, the central patch of a region of interest is correlated with a dense sampling of patches over the entire region. The resulting correlation surface is spatially quantized into a small number of representative correlation values that represent the appearance signature. A region of interest is compared to a candidate region by determining the sum of differences between respective appearance signatures of the regions. This self-similarity method characterizes the geometric shape of a region independently of photometric properties. However, this self-similarity method may not discriminate different objects with similar shape, such as people. Further, this self-similarity method may not match articulated objects under large changes in shape.

Another method for modelling appearance under photometric variations is used to classify image regions as objects or background in thermal infrared images. A region of interest is divided into a regular grid of cells, and average pixel intensity is determined for each cell. The pairwise average intensity difference between each cell and a predetermined representative cell are concatenated to determine an appearance signature. A binary classifier is trained to discriminate objects from background using appearance signatures from a training set of labelled regions. However, the determined appearance signature is sensitive to the unpredictable content of the predetermined reference cell and to changes in overall contrast in the region.

SUMMARY

It is an object of the present invention to substantially overcome, or at least ameliorate, one or more disadvantages of existing arrangements.

Disclosed are arrangements, referred to as Photometric Invariant Self-dissimilarity Matching (PISM) arrangements, which seek to address the above by determining an appearance signature based on self-dissimilarity between distributions of image features in pairs of regions on an object of interest. The disclosed arrangements enable an object of interest to be re-identified across camera views with variations in focus, shadows, brightness, contrast, white balance and other photometric properties, unlike existing methods that are invariant to only some of these properties or sensitive to noise.

In one example, the terms "candidate object" and "object of interest" respectively refer to (i) a person in a crowded airport, the person being merely one of the crowd, and (ii) a person in that crowd that has been identified as being of particular interest.

According to one aspect of the present disclosure, there is provided a method of identifying an object in an image, the method comprising: determining at least one feature map for each of a plurality of cells in the image; determining a self-dissimilarity between a first feature map associated with a first one of said cells and a second feature map associated with a second cell, wherein the self-dissimilarity is determined by determining a sum over thresholds of a difference in area between the first feature map and the second feature map; forming an appearance signature for the object based on the determined self-dissimilarity; determining a distance between the appearance signature of the object in the image and appearance signatures of each of a plurality of further objects; and identifying the object in the image based on the determined distances.

According to another aspect of the present disclosure, there is provided a system for identifying an object in an image, the system comprising: a memory for storing data and a computer program; at least one processor coupled to the memory for executing the computer program, the computer program comprising instructions to and/or the at least one processor operating to: determine at least one feature map for each of a plurality of cells in the image; determine a self-dissimilarity between a first feature map associated with a first one of said cells and a second feature map associated with a second cell, wherein the self-dissimilarity is determined by determining a sum over thresholds of a difference in area between the first feature map and the second feature map; form an appearance signature for the object based on the determined self-dissimilarity; determine a distance between the appearance signature of the object in the image and appearance signatures of each of a plurality of further objects; and identify the object in the image based on the determined distances.

According to still another aspect of the present disclosure, there is provided an apparatus for identifying an object in an image, the apparatus comprising: means for determining at least one feature map for each of a plurality of cells in the image; means for determining a self-dissimilarity between a first feature map associated with a first one of said cells and a second feature map associated with a second cell, wherein the self-dissimilarity is determined by determining a sum over thresholds of a difference in area between the first feature map and the second feature map; means for forming an appearance signature for the object based on the determined self-dissimilarities; means for determining a distance between the appearance signature of the object in the image and appearance signatures of each of a plurality of further objects; and means for identifying the object in the image based on the determined distances.

According to still another aspect of the present disclosure, there is provided a method of identifying an object in an image, the method comprising: determining at least one feature map for each of a plurality of cells in the image; determining a self-dissimilarity between a first feature map associated with a first one of said cells and a second feature map associated with a second cell, wherein the self-dissimilarity is determined by determining a sum over thresholds of a difference in area between the first feature map and the second feature map; forming an appearance signature for the object based on the determined self-dissimilarity; determining a distance between the appearance signature of the object in the image and appearance signatures of each of a plurality of further objects; and identifying the object in the image based on the determined distances.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
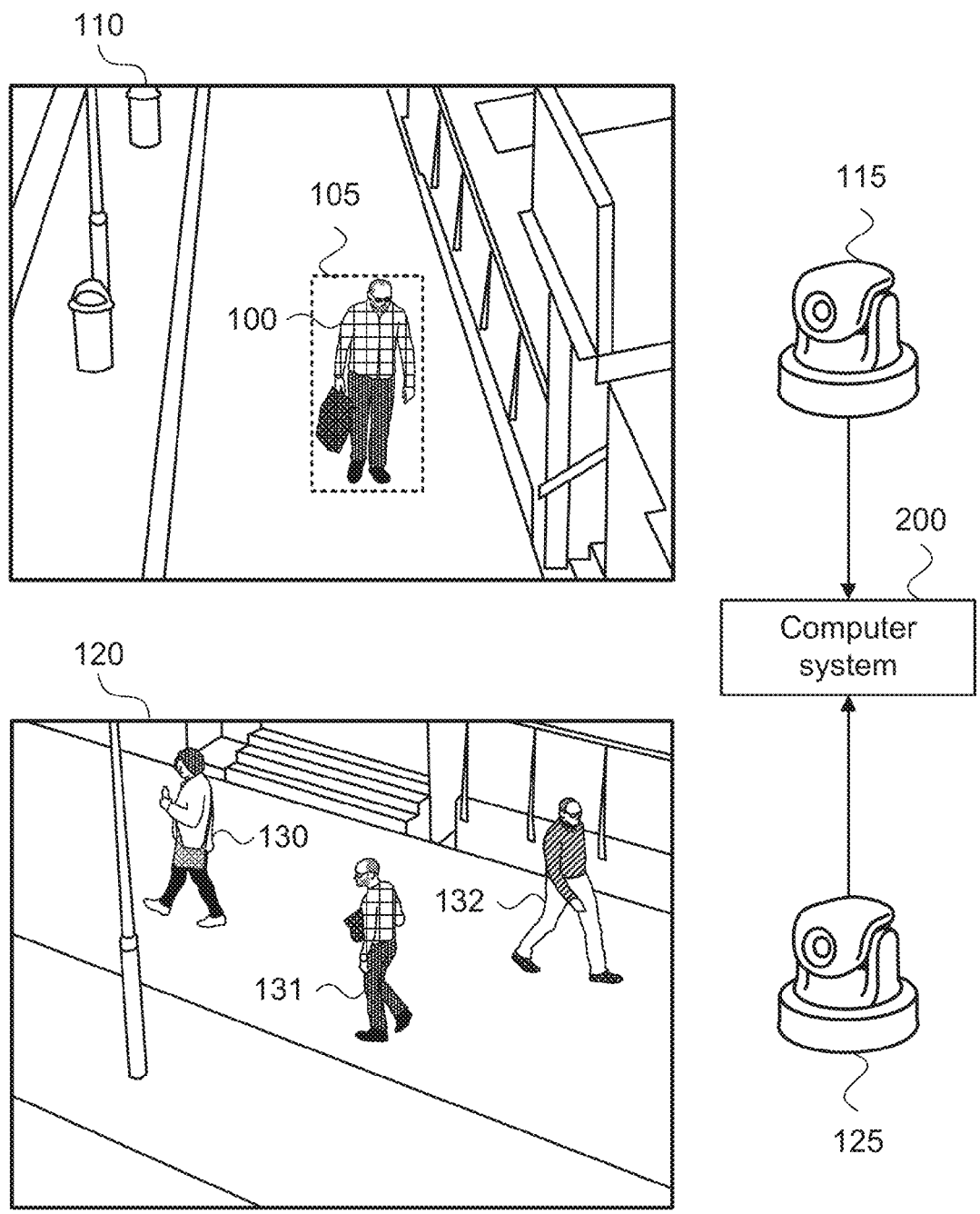
FIG. 1 shows an image of an object of interest captured by a first digital camera and an image of candidate objects captured by a second digital camera.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

The present description provides a method and system for matching objects between two camera views with different photometric characteristics using an appearance signature based on self-dissimilarity. In one example which will be described with reference to FIG. 1, the described methods use photometric invariant self-dissimilarity matching (PISM) to determine whether a person of interest 100 observed in an image 110 of a first scene captured by a first digital camera 115, is present in an image 120 of a second scene captured by a second digital camera 125. The cameras 115 and 125 are connected to a computer system 200 implementing the described methods. In the example of FIG. 1, the second image 120 contains three people 130, 131 and 132 that may be the person of interest 100. The described methods use photometric invariant self-dissimilarity matching (PISM) to determine which of the three objects 130, 131 and 132 is a best match for the object of interest 100. The described photometric invariant self-dissimilarity matching (PISM) methods may equally be applied when images of the object of interest and candidate objects are captured by different cameras simultaneously or at different times, or where the images are captured by the same camera at different times. The described photometric invariant self-dissimilarity matching (PISM) methods may equally be applied when images of the object of interest and candidate objects include images that represent the same scene or different scenes, or multiple scenes with different candidate objects.

An image, such as the image 110, is made up of visual elements. The terms "pixel", "pixel location" and "image location" are used interchangeably throughout this specification to refer to one of the visual elements in a captured image. Each pixel of an image is described by one or more values characterising a property of the scene captured in the image. In one example, a single intensity value characterises brightness of the scene at a pixel location. In another example, a triplet of values characterise the colour of the scene at the pixel location. Furthermore, a "region", "image region" or "cell" in an image refers to a collection of one or more spatially adjacent visual elements.

A "feature" represents a derived value or set of derived values determined from the pixel values in an image region. In one example, a feature is a histogram of colour values in the image region. In another example, a feature is an "edge" response value determined by estimating an intensity gradient in the region. In yet another example, a feature is a filter response, such as a Gabor filter response, determined by the convolution of pixel values in the region with a filter kernel.

Furthermore, a "feature map" assigns a feature value to each pixel in an image region. In one example, a feature map assigns an intensity value to each pixel in an image region. In another example, a feature map assigns a hue value to each pixel in an image region. In yet another example, a feature map assigns a Gabor filter response to each pixel in an image region.

A "feature distribution" refers to the relative frequency of feature values in a feature map, normalized by the total number of feature values. In one photometric invariant self-dissimilarity matching (PISM) arrangement, a feature distribution is a normalized histogram of feature values in a feature map. In another photometric invariant self-dissimilarity matching (PISM) arrangement, a feature distribution is estimated using Kernel Density Estimation (KDE) based on the feature values in the feature map. In yet another example, a feature distribution is estimated as a Gaussian Mixture Model (GMM) based on the pixel values in the feature map.

As shown in FIG. 1, the digital cameras 115 and 125 communicate with a computer system 200. The arrangement of FIG. 1 can be applied to a range of applications. In one example, the computer system 200 allows a security guard to select an object of interest through an interactive user interface, and returns images of one or more candidate objects determined to be the object of interest. In another example, the computer system 200 may be configured to automatically select an object of interest and matches the object across multiple distributed cameras in order to analyse the long-term behaviour of the object.

As described above, the present description relates to methods that enable an object of interest to be matched across camera views despite variations in shadows, brightness, contrast, white balance, blur and other photometric properties. The described photometric invariant self-dissimilarity matching (PISM) methods enable photometric invariant matching by determining an appearance signature based on self-dissimilarity. Self-dissimilarity quantifies the relatively difference in appearance between pairs of cells in an image of the object of interest. Each cell is an image region covering a small portion of the object. Relative differences between cells are invariant to photometric changes, as can be illustrated with reference to the person of interest 100 in FIG. 1. In one example of photometric invariance, the shirt of the person of interest 100 would remain relatively lighter than the pants despite changes in, for example, brightness, contrast and white balance of the image 110. In another example of photometric invariance, the pants of the target of interest 100 would retain a more uniform colour than the patterned shirt despite changes in focus or motion blur in the image 110. The self-dissimilarity appearance model in disclosed photometric invariant self-dissimilarity matching (PISM) arrangements encodes the relative difference across many pairs of cells and types of features.

Figure 3:
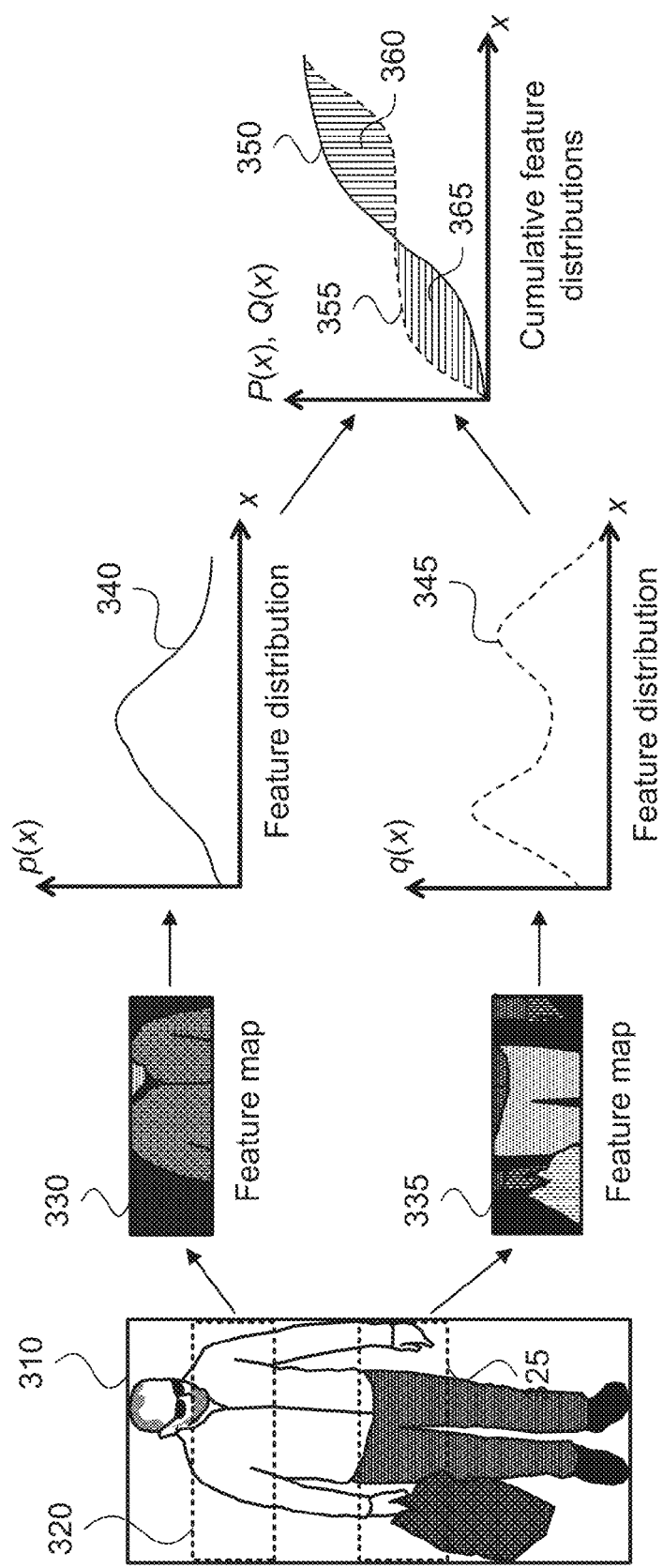
FIG. 3 shows the process of determining a self-dissimilarity between a pair of cells on an image of an object, according to one photometric invariant self-dissimilarity matching (PISM) arrangement.

FIG. 3 illustrates the process of determining the self-dissimilarity between an ordered pair of cells, according to one photometric invariant self-dissimilarity matching (PISM) arrangement. In the example of FIG. 3, the self-dissimilarity is determined between a first cell 320 and a second cell 325 in the image region 310 of an object of interest. A first feature map 330 is determined from pixel values in the first cell 320, and a second feature map 335 is determined from pixel values in the second cell 325. In one example, a feature map determines an intensity value for each pixel in a cell. In another example, a feature map determines a Gabor filter response for each pixel in a cell.

Next, a pair of feature distributions 340 and 345 is determined respectively from the first feature map 330 and second feature map 335. For the feature distributions 340 and 345 shown in FIG. 3, the horizontal axis represents a feature value x, and the vertical axis represent the relative frequency of each feature value, denoted as p(x) and q(x) for the first and second feature maps respectively.

The function of the self-dissimilarity measure described in disclosed photometric invariant self-dissimilarity matching (PISM) arrangements is to quantify the difference between the first feature distribution 340 and the second feature distribution 345. A known metric for quantifying the difference between two distributions is the "earth mover's distance" (EMD). The earth movers distance (EMD) can be described by considering the feature distributions 340 and 345 as analogous to two mounds of dirt. Then, the earth movers distance (EMD) is equivalent to the minimum amount of work required to rearrange the dirt in one pile so that the dirt matches the shape of the other pile. In practice, the earth movers distance (EMD) between one-dimensional feature distributions p(x) and q(x), denoted as EMD(p,q), is defined in accordance with Equation (1) (referred to here as the "Earth Mover's Distance Equation") as follows:

$$EMD(p,q)=\int |P(x)-Q(x)|dx \quad (1)$$

In Equation (1), P(x) and Q(x) represent the cumulative feature distributions corresponding to p(x) and q(x). The cumulative feature distribution P(x) for a feature map with a feature distribution of p(x) represents the proportion of pixels in the feature map with a feature value of x or less. Thus, the cumulative feature distribution P(x) can also be interpreted as the normalized area of the feature map thresholded at a value of x, normalized by the total area of the feature map. A cumulative feature distribution P(x) is determined in accordance with Equation (2) as follows:

$$P(x)=\int_0^x p(u)du \quad (2)$$

FIG. 3 shows the cumulative feature distributions 350 and 355 corresponding to the feature distributions 340 and 345 for the feature maps 330 and 335. The earth movers distance (EMD) between the feature maps 330 and 335, determined in accordance with the "Earth Mover's Distance Equation", is sum of the shaded areas 360 and 365 between the cumulative distributions.

The earth movers distance (EMD) as defined by the "Earth Mover's Distance Equation" is symmetric with respect to the feature maps being compared. A drawback of symmetry is that, in one example, feature distributions p(x) and q(x) corresponding respectively to a light shirt and dark pants will result in an earth movers distance (EMD) similar to feature distributions p(x) and q(x) corresponding respectively to a dark shirt and light pants. Thus, an appearance signature constructed using the above earth movers distance (EMD) may not distinguish between people with significantly different appearance. To overcome this limitation, in one of the disclosed photometric invariant self-dissimilarity matching (PISM) arrangements, a modified metric referred to in this disclosure as the "signed earth mover's distance" (sEMD) is defined in accordance with Equation (3) (referred to here as a "Signed Earth Mover's Distance Equation") as follows:

$$EMD^+(p,q)=\int H(P(x)-Q(x))dx$$

$$EMD^-(p,q)=\int H(Q(x)-P(x))dx \quad (3)$$

The function H(•) used in Equation (3) is the 'Heaviside step function'. The signed earth mover's distance (sEMD) is the tuple comprised of the quantities $EMD^+(p,q)$ and $EMD^-(p,q)$. The quantity $EMD^+(p,q)$ corresponds to the shaded area 360 in FIG. 3, and the quantity $EMD^-(p,q)$ corresponds to the shaded area 365. If P(x) and Q(x) are interpreted as normalized areas of thresholded feature maps as described above, then $EMD^+(p,q)$ may also be interpreted as the sum, over all thresholds, of the difference in normalized area between an ordered pair of thresholded feature maps, where the first feature map has a larger area. Similarly, $EMD^-(p,q)$ may be interpreted as the sum, over all thresholds, of the difference in normalized area between an ordered pair of thresholded feature maps, where the second feature map has a larger area.

The signed earth mover's distance (sEMD) tuple is not symmetric with respect to the feature maps being compared. Consequently, an appearance signature constructed using the above signed earth mover's distance (sEMD) will have both photometric invariance and the ability to discriminate between people with different appearance.

In one photometric invariant self-dissimilarity matching (PISM) arrangement, an appearance signature is constructed as $S=(s_1, s_2, \ldots, s_{2N})^T$ by concatenating signed earth mover's distance (sEMD) tuples determined over N pairs of cells using Equation (3). In one photometric invariant self-dissimilarity matching (PISM) arrangement, a soft threshold is applied to the constructed appearance signatures in order to reduce the influence of noise and outliers in the object matching process. Each value $s_i$, i=1, 2, . . . , 2N in S is replaced with a new value $\tilde{s}_i$ defined in accordance with Equation (4) (referred to here as the "Soft Threshold Equation"), as follows:

$$\tilde{s}_i=1-\exp(-s_i/\sigma) \quad (4)$$

The strength of the soft threshold defined in Equation (4) is determined by the parameter σ. In one example, a soft threshold with a parameter of σ=2 is applied to each appearance signature.

Given appearance signatures $S_I$ and $S_C$ for an object of interest and a candidate object respectively, a known metric for the dissimilarity of the two objects is to determine a Mahalanobis distance $D(S_I, S_C)$ defined in accordance with Equation (5) (referred to here as the "Mahalanobis Distance Equation"), as follows:

$$D(S_I,S_C)=\sqrt{(S_I-S_C)^T \cdot M \cdot (S_I-S_C)} \quad (5)$$

The linear transformation matrix M in Equation (5) determines the contribution of each element in $S_I$ and $S_C$ to the distance $D(S_I, S_C)$. One method for determining M, referred to as "KISSME metric learning", uses a set of n positive training samples and m negative training samples. Each positive training sample is a pair of appearance signatures $S_{P,i}$ and $S'_{P,i}$, i=1, 2, . . . , n, representing the same object in different images. Each negative training sample is a pair of appearance signatures $S_{N,j}$ and $S'_{N,j}$, j=1, 2, . . . , m, representing different objects. Then, a linear transformation matrix M is determined in accordance with Equation (6) (referred to here as the "Metric Learning Equation"), as follows:

$$M=\Sigma_P^{-1}-\Sigma_N^{-1} \quad (6)$$

In Equation (6) above, the terms $\Sigma_P$ and $\Sigma_N$ represent covariance matrices determined from the positive and negative training samples in accordance with Equation (7) as:

$$\sum_P = \frac{1}{n} \sum_i (S_{P,i} - S'_{P,i})^T \cdot (S_{P,i} - S'_{P,i}) \quad (7)$$

$$\sum_N = \frac{1}{m} \sum_j (S_{N,j} - S'_{N,j})^T \cdot (S_{N,j} - S'_{N,j})$$

In one or more photometric invariant self-dissimilarity matching (PISM) arrangements, dimensionality reduction is applied to the appearance signatures to improve computational efficiency and reduce the influence of measurement noise in object matching and metric learning. Dimensionality reduction projects a high-dimensional appearance signature $S=(s_1, s_2, \ldots, s_{2N})^T$ to a low-dimensional appearance signature $\hat{S}=(\hat{s}_1, \hat{s}_2, \ldots, \hat{s}_M)^T$, where M<2N. In one photometric invariant self-dissimilarity matching (PISM) arrangement, dimensionality reduction is implemented as a linear projection from a 2N-dimensional space to an M-dimensional space, in accordance with Equation (8) (referred to here as a "Projection Equation"), as follows:

$$\hat{S} = B \cdot (S - \bar{S}) \quad (8)$$

In one photometric invariant self-dissimilarity matching (PISM) arrangement, the parameters $\bar{S}$ and B in Equation (8) are determined using Principal Component Analysis (PCA) from a training set of k appearance signatures $S_i$, i=1, 2, ..., k. $\bar{S}$ represents the mean appearance signature computed according to $$\bar{S} = \frac{1}{k} \sum_i S_i.$$

B is a M×2N projection matrix, wherein the M rows of B are the eigenvectors corresponding to the M smallest eigenvalues of the covariance matrix of the training samples defined by $$\sum = \frac{1}{k} \sum_i (S_i - \bar{S})^T \cdot (S_i - \bar{S}).$$

In one photometric invariant self-dissimilarity matching (PISM) arrangement, M is set to a predetermined fixed value, such as 50. In another photometric invariant self-dissimilarity matching (PISM) arrangement, M is determined as the smallest number of the largest eigenvalues of the covariance matrix that sum to greater than a fixed proportion of the sum of all eigenvalues, such as 95%. In photometric invariant self-dissimilarity matching (PISM) arrangements that include dimensionality reduction, the Malalanobis distance in Equation (5) and metric learning in Equation (6) are applied directly to projected appearance signatures.

Figure 2A:
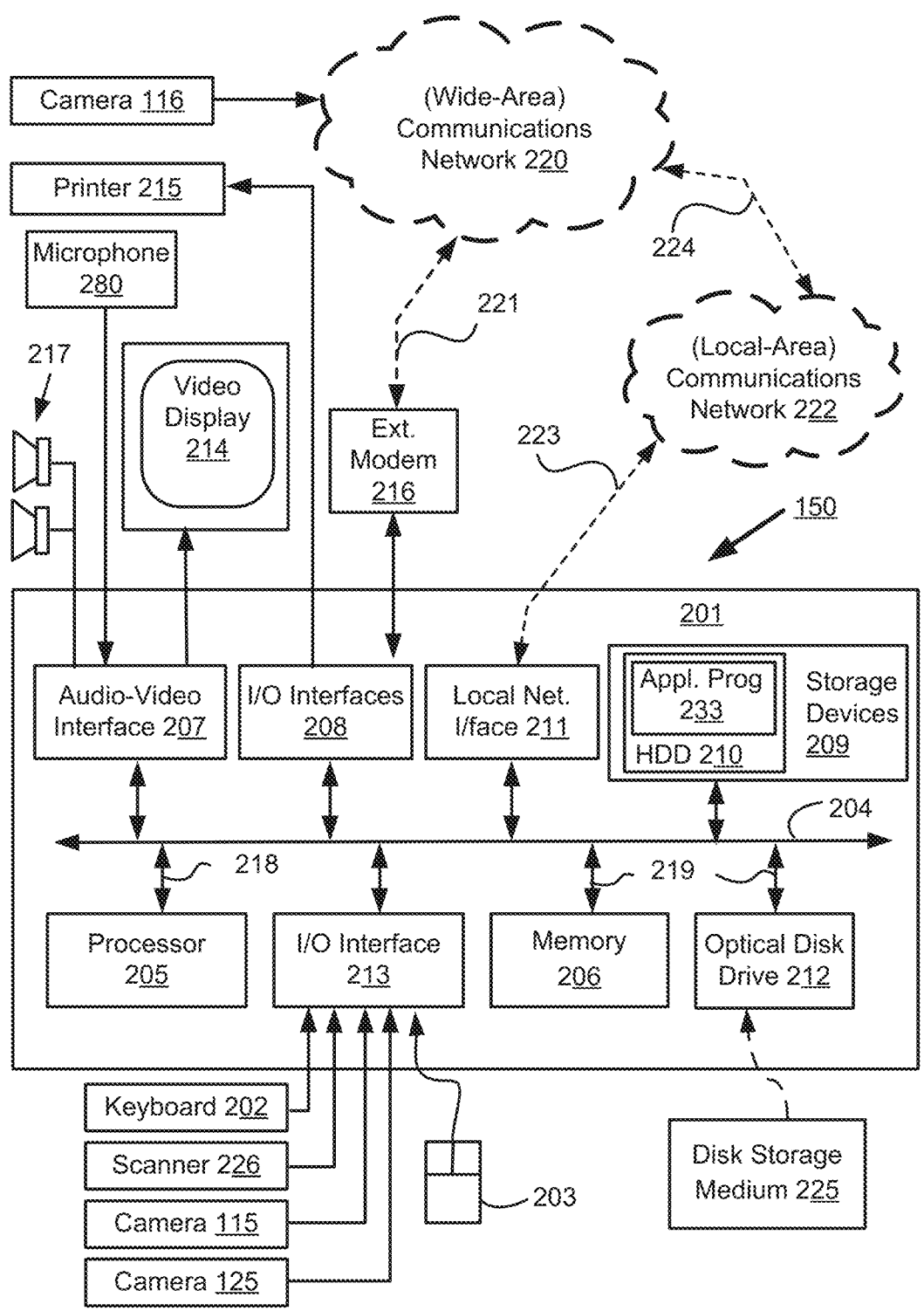
FIGS. 2A and 2B form a schematic block diagram of a general purpose computer system upon which PISM arrangements described can be practiced.
Figure 2B:
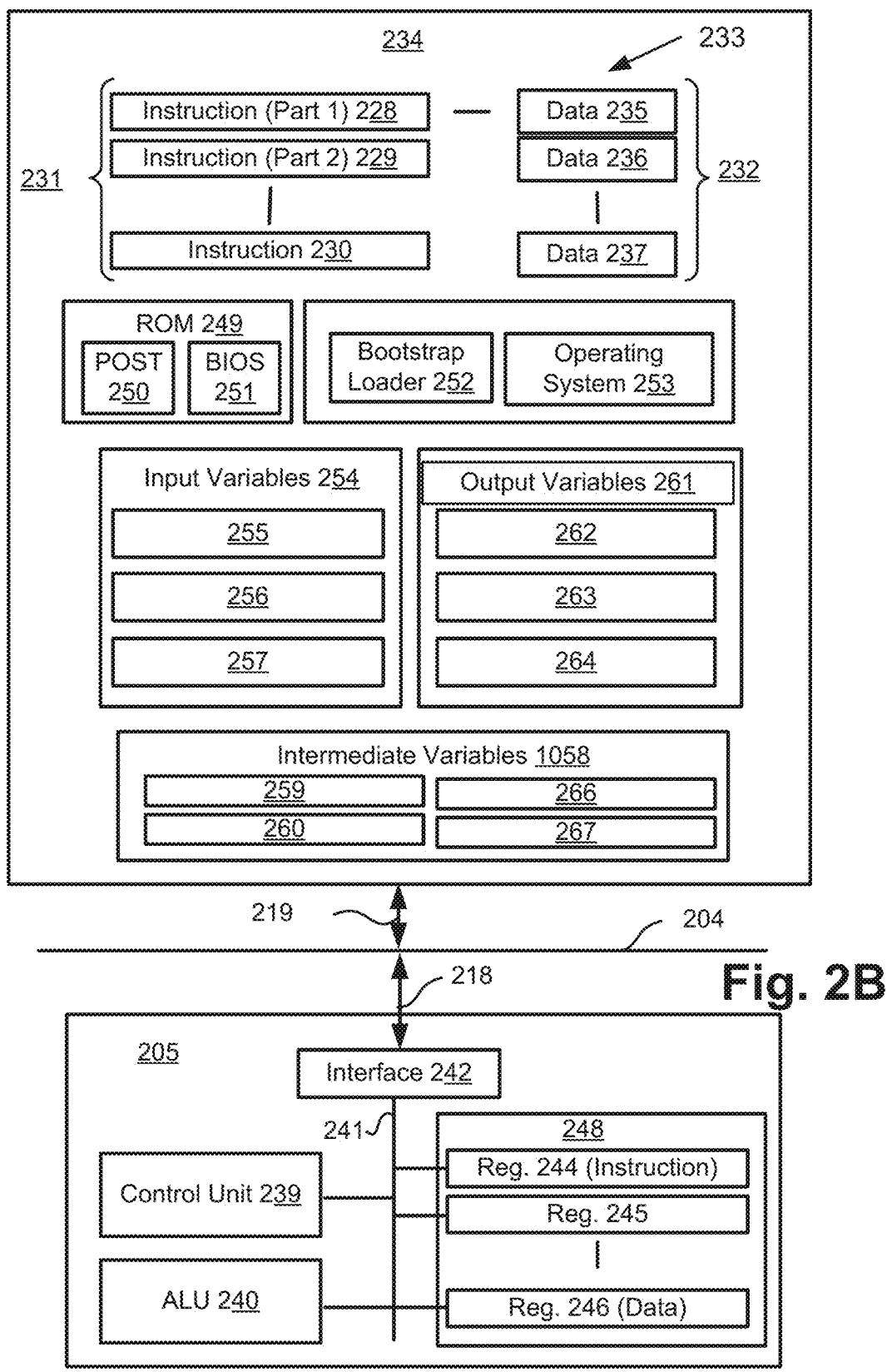

FIGS. 2A and 2B depict a general-purpose computer system 200, upon which the various photometric invariant self-dissimilarity matching (PISM) arrangements described can be practiced.

As seen in FIG. 2A, the computer system 200 includes: a computer module 201; input devices such as a keyboard 202, a mouse pointer device 203, a scanner 226, one or more cameras such as the cameras 115 and 125, and a microphone 280; and output devices including a printer 215, a display device 214 and loudspeakers 217. An external Modulator-Demodulator (Modem) transceiver device 216 may be used by the computer module 201 for communicating to and from remote cameras such as 116 over a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 115 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The described methods may be implemented using the computer system 200 wherein the processes of FIGS. 4, 5, 7A, 8 and 9, to be described, may be implemented as one or more photometric invariant self-dissimilarity matching (PISM) software application programs 233 executable within the computer system 200. In particular, the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 effects an advantageous apparatus for implementing the PISM method.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 effects an apparatus for practicing the PISM arrangements.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed photometric invariant self-dissimilarity matching (PISM) arrangements use input variables 254, which are stored in the memory 234 in corresponding memory locations 255, 256, 257. The photometric invariant self-dissimilarity matching (PISM) arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

- a fetch operation, which fetches or reads an instruction 231 from a memory location 228, 229, 230;
- a decode operation in which the control unit 239 determines which instruction has been fetched; and
- an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 7A, 8 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The photometric invariant self-dissimilarity matching (PISM) method may alternatively be implemented in dedicated hardware such as one or more integrated circuits performing the PISM functions or sub functions. Such dedicated hardware may include graphic processors, digital signal processors, or one or more microprocessors and associated memories, and may reside on platforms such as video cameras.

Figure 4:
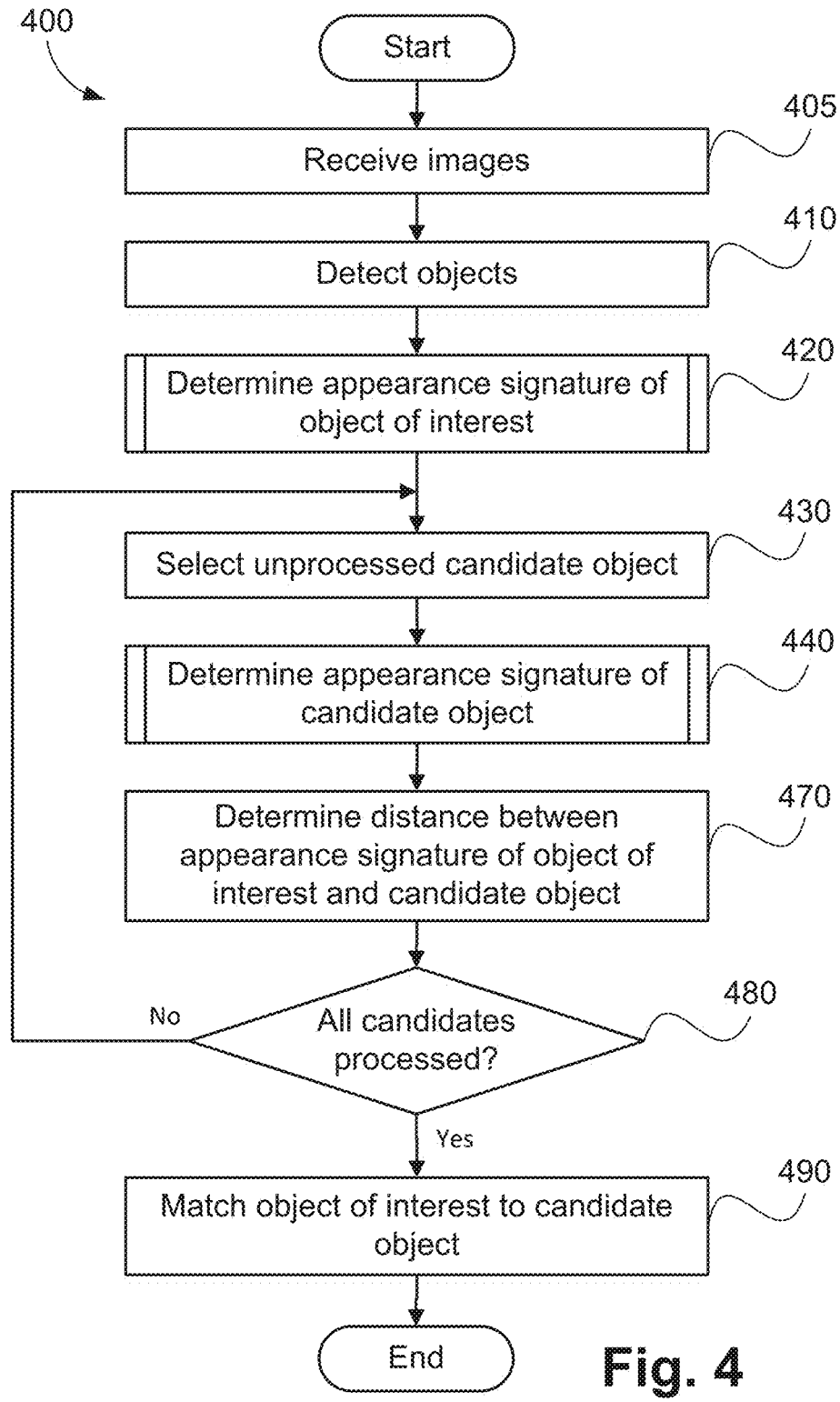
FIG. 4 is a schematic flow diagram showing a method of matching objects between images according to one photometric invariant self-dissimilarity matching (PISM) arrangement.

FIG. 4 shows a method 400 of matching objects between images using an appearance signature based on a self-dissimilarity, according to one photometric invariant self-dissimilarity matching (PISM) arrangement. In one example, the matching method 400 is used for identifying an object in an image. The method 400 may be implemented as one or more software code modules of the software application program 233 resident in the hard disk drive 210 and being controlled in its execution by the processor 205. The method 400 will be illustrated by way of example with reference to image 110 containing an object of interest 100, and image 120 containing candidate objects 130, 131 and 132, as shown in FIG. 1. In the example of FIG. 1, the method 400 determines which of the candidate objects 130, 131 and 132 is the object of interest 100. The following description provides details, examples and alternative implementations for the main steps of method 400. Further details, examples and alternative implementations of steps 420 and 440 are also described below.

The method 400 starts at receiving step 405, where an image containing the object of interest and at least one image containing candidate objects are received under execution of the processor 205. The received images may be stored in the memory 206.

Control then passes from step 405 to detecting step 410, where objects are detected in the images received as input in step 405, under execution of the processor 205. In one photometric invariant self-dissimilarity matching (PISM) arrangement, the objects are detected at the step 410 by performing foreground separation using a statistical background pixel modelling method such as Mixture of Gaussian (MoG), where the background model is maintained over multiple frames with a static camera. In another photometric invariant self-dissimilarity matching (PISM) arrangement, a foreground separation method is performed on Discrete Cosine Transform blocks. In yet another photometric invariant self-dissimilarity matching (PISM) arrangement, a foreground separation is performed on an unsupervised segmentation of the image, for example, using superpixels. In yet another photometric invariant self-dissimilarity matching (PISM) arrangement, the candidate object is detected using a supervised machine learning method, such as a pedestrian detector. The pedestrian detector classifies a set of regions of interest as containing a pedestrian or not based on a training set of pedestrian exemplars. In still yet another photometric invariant self-dissimilarity matching (PISM) arrangement, at least one object is manually detected through a graphical user interface. For example, a security guard may select a suspicious object by drawing a rectangle around the object in an image captured from a security camera.

The output of detection step 410 is two or more bounding boxes indicating image regions containing detected objects, including at least one bounding box for an object of interest and at least one bounding box for a candidate object. For the example shown in FIG. 1, the output of step 410 for the image 110 is the bounding box 105 containing the object of interest 100.

The method 400 then proceeds from step 410 to an appearance signature determining step 420, where an appearance signature $S_I$ is determined for the object of interest based on the pixel values in the bounding box for the object of interest determined at step 410. The determined appearance signature $S_I$ may be stored by the processor 205 in the memory 206. In one photometric invariant self-dissimilarity matching (PISM) arrangement, the appearance signature is constructed by concatenating into a vector the self-dissimilarities of multiple pairs of cells defined on different parts of the object, according to Equation (3) and illustrated in FIG. 3. In another photometric invariant self-dissimilarity matching (PISM) arrangement, step 420 includes reducing the dimensionality of the appearance signature, according to the linear projection defined by Equation (8). The linear projection is determined by a training method 700 which will be described later with reference to FIG. 7. A method 500 of determining an appearance signature, as will be described later with reference to FIG. 5, may applied to the object of interest at step 420 of method 400.

Control then passes from step 420 to a selecting step 430, where an unprocessed candidate object is selected for the purpose of comparison with the object of interest. In one arrangement, the candidate objects determined at detecting step 410 are stored in a list configured within memory 206, for example, and the next unprocessed candidate object is selected by enumerating the objects in the list.

The method 400 then proceeds from step 430 to a candidate appearance signature determining step 440, where an appearance signature $S_C$ for the candidate object selected at step 430 is determined, under execution of the processor 205, based on the pixel values in the corresponding bounding box determined at step 410. The appearance signature may be determined at step 440 using the methods of determining an appearance signature as described above with reference to step 420. In one arrangement, the method 500 for determining an appearance signature, which will be described later with reference to FIG. 5, may be applied to the candidate object at step 440 of method 400.

The method 400 then proceeds from step 440 to a distance determining step 470, where a distance $D(S_I, S_C)$ between the appearance signature $S_I$ of the object of interest determined at step 420 and the appearance signature $S_C$ of a candidate object determined at step 440, is determined under execution of the processor 205. The determined distance $D(S_I, S_C)$ may be stored by the processor 205 in the memory 206. In one photometric invariant self-dissimilarity matching (PISM) arrangement, the distance determined at step 470 is a Euclidean distance defined by $D(S_I, S_C) = \sqrt{(S_I - S_C)^T \cdot (S_I - S_C)}$. In another photometric invariant self-dissimilarity matching (PISM) arrangement, the distance determined at step 470 is a Manhattan distance defined by $D(S_I, S_C) = \Sigma_k |s_{I,k} - s_{C,k}|$, where $S_I = (s_{I,1}, s_{I,2}, \ldots, s_{I,2N})^T$ and $S_C = (s_{C,1}, s_{C,2}, \ldots, s_{C,2N})^T$. In yet another photometric invariant self-dissimilarity matching (PISM) arrangement, the distance determined at step 470 is a Mahalanobis distance defined by Equation (5). A method of determining a Mahalanobis distance metric from a set of training samples will be described in later with reference the method 700 of FIG. 7.

The method 400 then proceeds from step 470 to decision step 480, where it is determined whether every candidate object has been processed under execution of the processor 205. If a distance $D(S_I, S_C)$ has been determined between every candidate object and the object of interest, Yes, then the method 400 proceeds from step 480 to the matching step 490. If unprocessed candidate objects remain, No, method 400 returns from decision step 480 to the selecting step 430.

At the matching step 490, a match between the object of interest and zero or more candidate objects is determined. In one photometric invariant self-dissimilarity matching (PISM) arrangement, a single candidate object corresponding to the smallest distance determined at distance determining step 470 is selected as the best match to the object of interest.

In another photometric invariant self-dissimilarity matching (PISM) arrangement, the candidates are arranged at step 490 in an ordered list from the candidate corresponding to the smallest distance determined at step 470 to the candidate corresponding to the largest distance determined at step 470. A tuple of K candidates corresponding to the first K elements of the list are returned as the best matches to the object of interest. For example, the ten (10) best candidates corresponding to the ten (10) smallest distances determined at step 470 may be selected at step 490. In yet another photometric invariant self-dissimilarity matching (PISM) arrangement, an additional test is applied at step 490 to determine whether the distances determined at step 470 are smaller than a predetermined threshold distance. Candidates corresponding to a distance exceeding the predetermined threshold are discarded from the matching step.

In yet another photometric invariant self-dissimilarity matching (PISM) arrangement, the identity of a candidate object may be determined at step 490 based on the corresponding distance determined at step 470. If the distance is below a pre-determined threshold, then the candidate is identified as being the object of interest. Otherwise, the candidate is identified as unknown. The method 400 concludes after completing the matching step 490.

Figure 5:
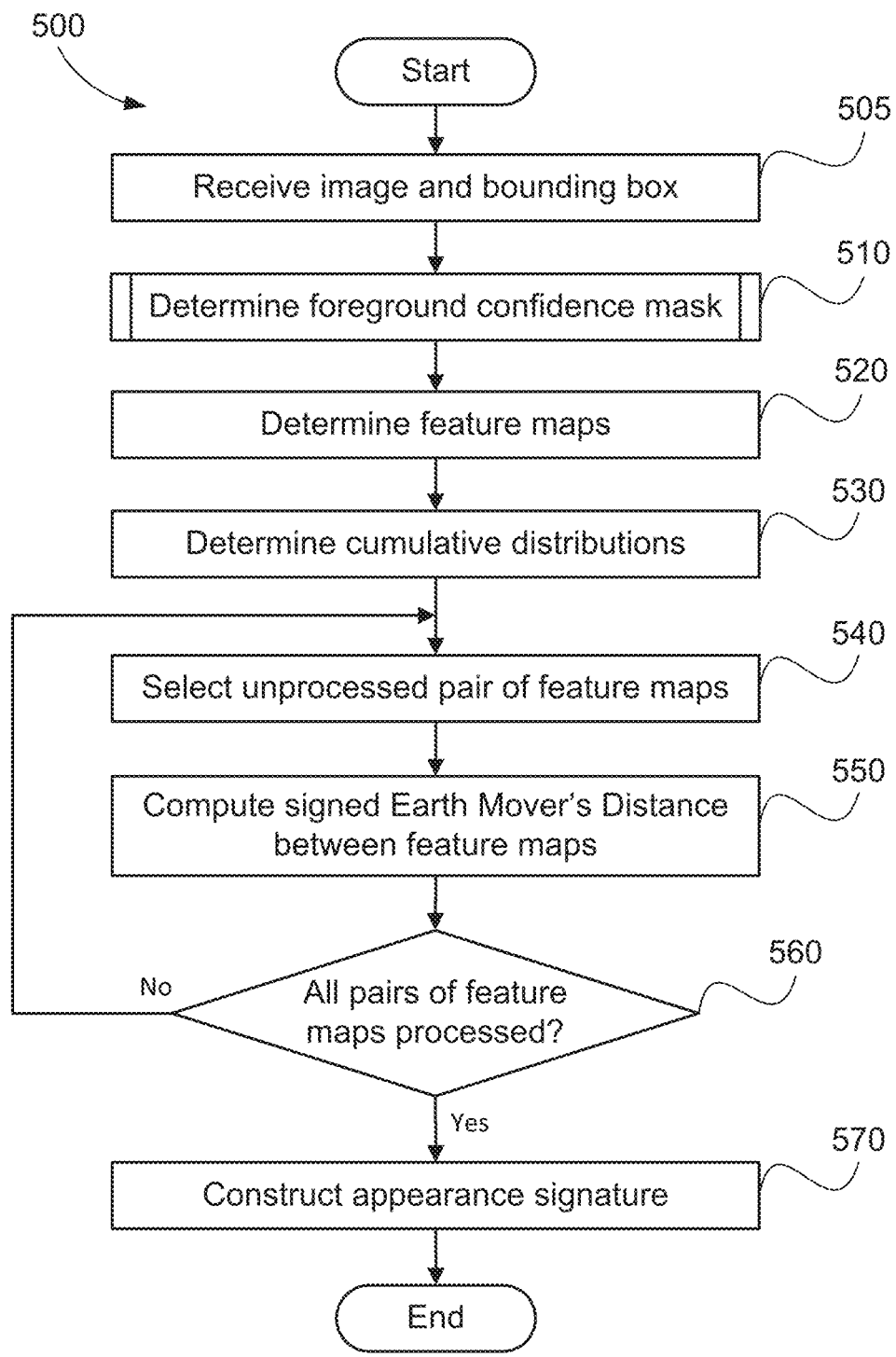
FIG. 5 is a schematic flow diagram showing a method of determining an appearance signature of an object as used in the method of FIG. 4.

A method 500 of determining an appearance signature of an object, as executed at steps 420 and 440 of method 400, will now be described with reference to FIG. 5. The method [5]00 may be implemented as one or more software code modules of the software application program 233 resident in the hard disk drive 210 and being controlled in its execution by the processor 205.

The method 500 starts at the retrieving step 505, where an image of the object and the corresponding bounding box determined at step 410 of the method 400 are received as input, under execution of the processor 205. The image and bounding box received at step 505 may be stored in the memory 206. In one example, when the method 500 is applied to the object of interest 100 shown in FIG. 1, the image 110 and the bounding box 105 are received as input at step 505.

Control then passes from step 505 to confidence determining step 510, where a foreground confidence mask is determined under execution of the processor 205. The foreground confidence mask assigns to each pixel in the bounding box received at step 505 a value indicating a confidence that the pixel belongs to an object. In one photometric invariant self-dissimilarity matching (PISM) arrangement, the foreground confidence mask is determined based on a vertical symmetry of the object. A method 800 of determining a foreground confidence mask based on a vertical symmetry, as executed at step 510, will be described later with reference to FIG. 8.

Figure 6C:
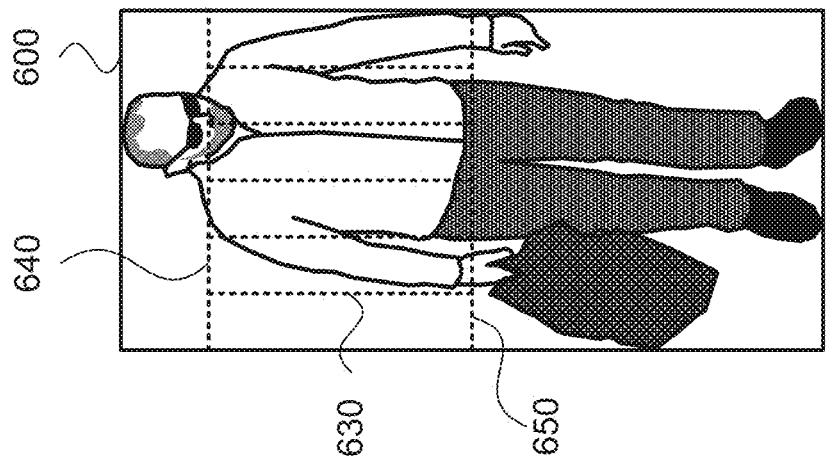
FIGS. 6A, 6B and 6C collectively show a set of partitions of a bounding box divided into rectangular cells as used in the method of FIG. 5.
Figure 6B:
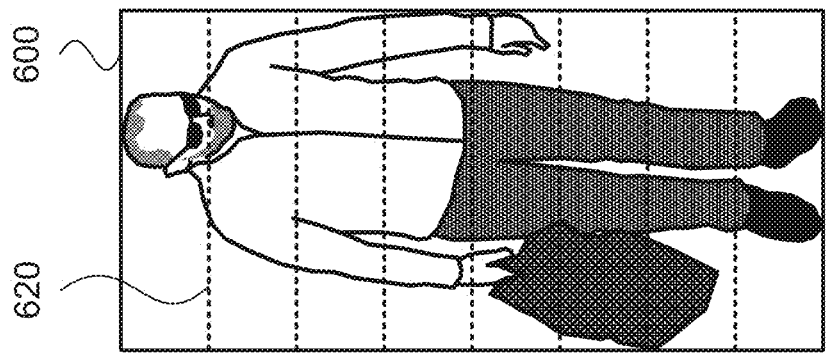
Figure 6A:
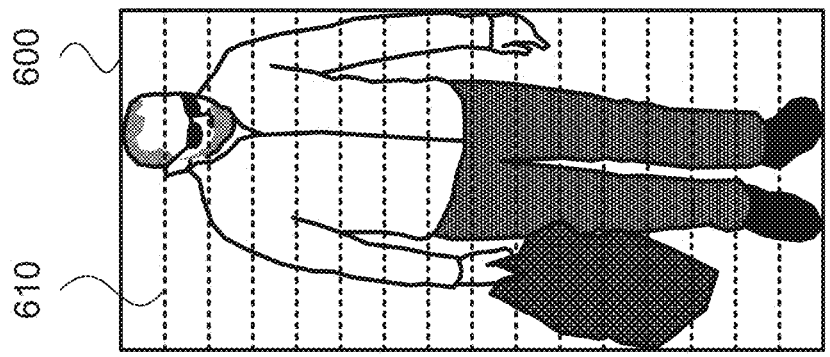

The method 500 then proceeds from step 510 to a feature map determining step 520. At step 520, one or more features maps on a set of cells are determined under execution of the processor 205. Each cell covers a portion of the bounding box received at step 5]05. In one photometric invariant self-dissimilarity matching (PISM) arrangement, as illustrated in FIG. 6A, the set of cells used at step 520 includes sixteen (16) rectangular cells constructed by partitioning the bounding box 600 according to fifteen (15) uniformly spaced horizontal cell boundaries, such as the horizontal boundary 610. In another photometric invariant self-dissimilarity matching (PISM) arrangement, as illustrated in FIG. 6B, the set of cells used at step 510 includes eight (8) rectangular cells constructed by partitioning the bounding box 600 according to seven (7) uniformly spaced horizontal cell boundaries, such as the cell boundary 620. In yet another photometric invariant self-dissimilarity matching (PISM) arrangement, as illustrated in FIG. 6C, the set of cells used at step 520 includes six (6) rectangular cells constructed by partitioning the bounding box 600 according to five (5) uniformly spaced vertical cell boundaries, such as the division 630, between an upper horizontal cell boundary 640 and a lower horizontal cell boundary 650. In alternative implementations of step 600, the cells used at step 520 may be defined at other scales and aspect ratios.

For each cell determined as described above, one or more feature maps are determined at step 520 based on the corresponding pixel values in the image received at step 505. A feature map assigns a single feature value to each pixel in the cell. In one described photometric invariant self-dissimilarity matching (PISM) arrangement, feature maps for the intensity, hue, saturation, chrominance, colour opponency and Gabor filter response at each pixel are determined at step 430. In another photometric invariant self-dissimilarity matching (PISM) arrangement, additional feature maps for directional image gradients and texture filter responses may be determined at step 430. The feature maps determined at step 520 may be stored in the memory 206 by the processor 205.

The method 500 then proceeds from step 520 to cumulative distribution determining step 530, where a cumulative distribution is determined for each feature map determined at step 520. In one photometric invariant self-dissimilarity matching (PISM) arrangement, a normalized histogram is first determined at step 530 by computing the relative frequency of feature values $h_b$, b=1, 2, . . . B, within B uniformly sized bins covering the full range of feature values. In one example, feature values range from zero (0) to two hundred and fifty five (255) and a normalized histogram is constructed using sixteen (16) bins, each covering a contiguous range of sixteen (16) feature values. A corresponding cumulative distribution $H_b$, b=1, 2, . . . B, over the same B bins is then determined according to $H_b = \sum_{i=1}^{b} h_i$. The cumulative distribution determined at step 530 may be stored in the memory 206 by the processor 205.

In another described photometric invariant self-dissimilarity matching (PISM) arrangement, a cumulative distribution $H_b$, b=1, 2, . . . B, is determined at step 530 by thresholding the corresponding feature map at B fixed threshold values, and determined the area of each binarized feature map normalized by the total area of the feature map. For example, sixteen (16) threshold values defined by f=16b, b=1, 2, . . . , 16, may be applied to a feature map to determine the cumulative distribution $H_b$.

In yet another described photometric invariant self-dissimilarity matching (PISM) arrangement, a foreground confidence mask determined at step 510 is used to determine a weighted cumulative distribution at step 530. In a weighted cumulative distribution, the contribution of a feature value at a pixel is weighted by the foreground confidence value at that pixel. In one example, a weighted normalized histogram may be determined at step 530 by summing the confidence values associated with feature values in each bin, and normalizing by the sum of all confidence values in the foreground confidence mask. In another example, a weighted area for each thresholded feature map is determined at step 530 by summing the foreground confidence values corresponding to pixels with a feature value below the threshold, normalized by the sum of all confidence values in the foreground confidence mask. Weighting the cumulative distribution using the foreground confidence mask reduces the influence of uninformative or distracting background features in the object matching process.

The method 500 then proceeds from step 530 to selecting step 540, where an unprocessed ordered pair of feature maps is selected, under execution of the processor 205, for the purpose of determining a self-dissimilarity in step 550. In one arrangement, the feature maps determined at step 520 are stored in a list configured within the memory 206, and ordered pairs of feature maps are selected by enumerating all factorial combinations of two feature maps in the list, ordered by relative location of the feature maps in the list. In another photometric invariant self-dissimilarity matching (PISM) arrangement, only ordered pairs of feature maps corresponding to the same type of feature, for example hue, in different cells are enumerated at step 540, which improves the computational efficiency of the matching process.

In yet another photometric invariant self-dissimilarity matching (PISM) arrangement, the list of feature maps is augmented with an additional, pre-determined canonical feature map for each type of feature. In one example, a pre-determined canonical feature map has a cumulative distribution corresponding to a step function, with the step at the centre of the range of feature values. The canonical feature maps provide a set of absolute reference points when determining an appearance signature based on self-dissimilarity. The absolute reference points help the matching method to discriminate objects that have different appearance but similar self-dissimilarity.

Control then passes from step 540 to signed earth mover's distance (sEMD) determining step 550, where the signed earth mover's distance (sEMD) is determined according to Equation (3) for the ordered pair of feature maps selected at step 540. In determining Equation (3), the cumulative distributions P(x) and Q(x) correspond to the cumulative distributions determined at step 530 for the first and second selected feature maps. As described earlier, step 530 can be interpreted as determining the sum, over all thresholds, of the difference in normalized area between an ordered pair of thresholded feature maps, where the first feature map has a larger area; and the sum, over all thresholds, of the difference in normalized area between an ordered pair of thresholded feature maps, where the second feature map has a larger area. The signed earth mover's distance (sEMD) determined at step 540 may be stored in the memory 206 by the processor 205.

In one photometric invariant self-dissimilarity matching (PISM) arrangement, at step 550, the signed earth mover's distance (sEMD) between ordered pairs of feature maps that include a feature map determined at step 520 as a first feature map, and a predefined canonical feature map defined at step 540 as a second feature map, is determined under execution of the processor 205.

The method 500 then proceeds from step 550 to decision step 560, where it is determined if every ordered pair of feature maps has been processed. If a signed earth mover's distance (sEMD) has been determined for every ordered pair of feature maps, Yes, then the method 500 proceeds from step 560 to the appearance signature constructing step 570. If unprocessed pairs of feature maps remain, No, then the method 500 returns from decision step 560 to the selecting step 540.

At the appearance signature constructing step 570, an appearance signature is determined based on the signed earth mover's distance (sEMD) values representing the self-dissimilarities determined at step 550. In one photometric invariant self-dissimilarity matching (PISM) arrangement, a vector $S=(s_1, s_2, \ldots, s_{2N})^T$ representing an appearance signature is constructed at step 570 by concatenating signed earth mover's distance (sEMD) tuples determined over N ordered pairs of feature maps determined at step 550. In another photometric invariant self-dissimilarity matching (PISM) arrangement, a soft threshold is applied to the determined appearance signature according to Equation (4).

In another photometric invariant self-dissimilarity matching (PISM) arrangement, the determined appearance signature S is reduced in dimensionality to $\hat{S}=(\hat{s}_1, \hat{s}_2, \ldots, \hat{s}_M)^T$, where M<2N, by applying a linear projection determined using Principal Component Analysis (PCA), as defined in Equation (8). In another photometric invariant self-dissimilarity matching (PISM) arrangement, Locally-Linear Embedding (LLE) is used to determine a non-linear mapping of an appearance signature S into a lower dimensional appearance signature $\hat{S}$. One implementation of a method 700 used to determine the parameters of a low-dimensional projection will be described in detail below with reference to FIG. 7. The appearance signature determined at step 570 may be stored in the memory 206 by the processor 205. Method 500 concludes at the completion of step 570.

Figure 7:
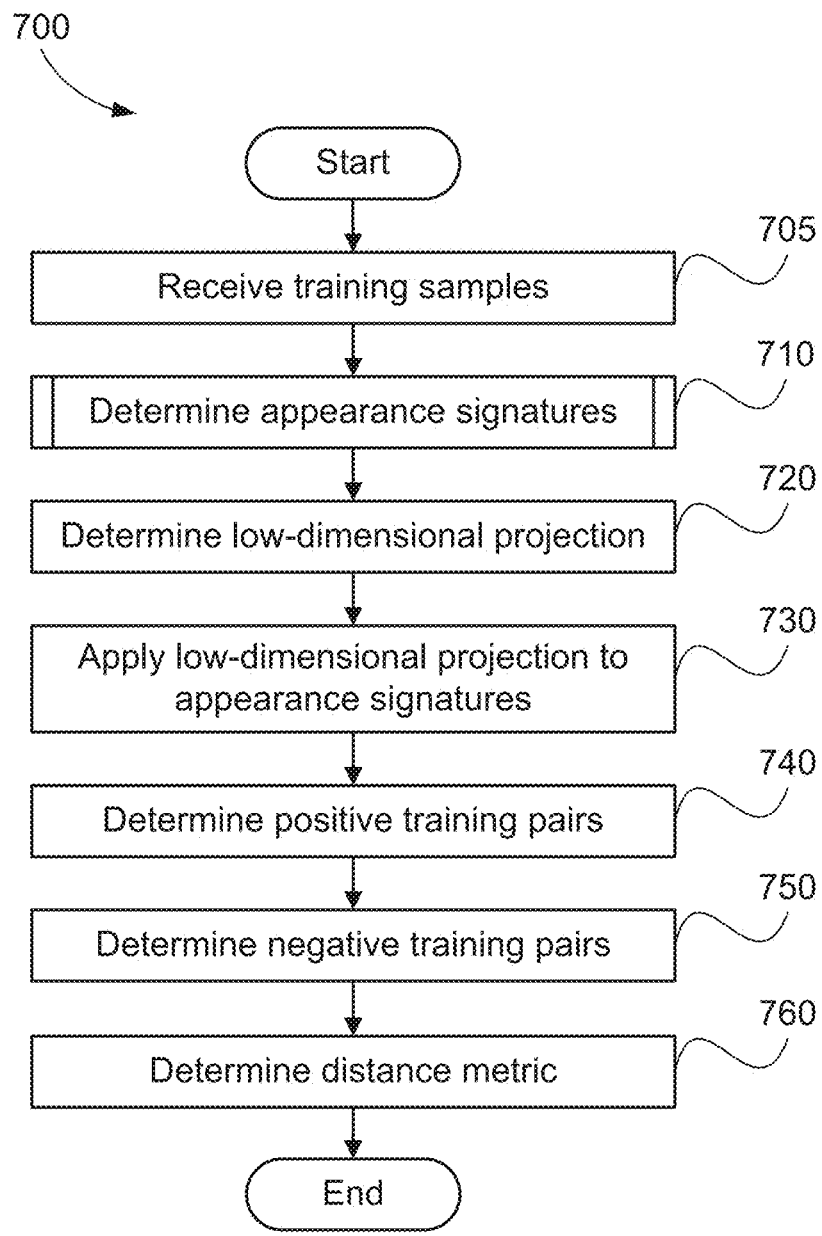
FIG. 7 is a schematic flow diagram showing a method of determining a distance metric and low-dimensional projection according to one photometric invariant self-dissimilarity matching (PISM) arrangement.

A training method 700 will now be described with reference to FIG. 7. The method 700 may be implemented as one or more software code modules of the software application program 233 resident in the hard disk drive 210 and being controlled in its execution by the processor 205. The method 700 determines the distance metric used in one implementation of step 470 of method 400, and the low-dimensional projection applied in one implementation of step 570 of method 500.

The method 700 starts at the retrieving step 705, where training samples are received as input, under execution of the processor 205. The received training samples may be stored in the memory 206 by the processor 205. In one photometric invariant self-dissimilarity matching (PISM) arrangement, each training samples consists of an image, a bounding box indicating a region of the image containing an object, and a label indicating the identity of the object. Training samples with the same label correspond to different examples of the same object, and training samples with different labels correspond to examples of different objects. The training samples received at step 705 comprise at least two different samples of the same object, with the same label, and at least two samples to different objects, with different labels.

Method 700 then proceeds from step 705 to appearance signature determining step 710, where an appearance signature is determined for each training sample received at step 705. In one photometric invariant self-dissimilarity matching (PISM) arrangement, step 710 is implemented by invoking the method 500 for each received training sample, without applying a low-dimensional projection at step 570.

Control then passes from step 710 to projection determining step 720, where the low-dimensional projection applied in one implementation of step 570 of method 500 is determined under execution of the processor 205. In one photometric invariant self-dissimilarity matching (PISM) arrangement, the parameters $\bar{S}$ and B of the projection defined in Equation (8) are determined at step 720 by applying principal component analysis (PCA) as previously described. For example, principal component analysis (PCA) is applied to the appearance signatures determined at step 710 for all of the training samples received at step 705. In another photometric invariant self-dissimilarity matching (PISM) arrangement, a non-linear low-dimensional projection is learnt by determining the parameters of a locally-linear embedding (LLE) from the training samples received at step 705. The low-dimensional projection determined at step 720 is used in at least one implementation of the appearance signature constructing step 570 of method 500. The low-dimensional projection determined at step 720 may be stored in the memory 206 by the processor 205.

Method 700 then proceeds from step 720 to projecting step 730, where the low-dimensional projection determined at step 720 is applied to the appearance signatures determined at step 710. In one photometric invariant self-dissimilarity matching (PISM) arrangement, an appearance signature S is linearly projected to a low-dimensional appearance signature, $\hat{S}$, according to Equation (8), using the principal component analysis (PCA) parameters, $\bar{S}$ and B, determined at step 730. Other implementations of step 730 may equally be practiced based on the low-dimensional projection determined at step 720.

Method 700 then proceeds from step 730 to the positive pair determining step 740, where a set of positive training pairs, comprising a subset of the training samples received at step 705, is determined under execution of the processor 205. A positive training pair is a pair of training samples corresponding to the same object. In one photometric invariant self-dissimilarity matching (PISM) arrangement, positive training pairs are determined by searching the training samples received at step 705 for all pairs of samples with identical labels. The positive training pairs determined at step 730 may be stored in the memory 206 by the processor 205.

Method 700 then proceeds from step 740 to the negative pair determining step 750, where a set of negative training pairs comprising a subset of the training samples received at step 705, is determined under execution of the processor 205. A negative training pair is a pair of training samples with different labels. In one photometric invariant self-dissimilarity matching (PISM) arrangement, negative training pairs are determined by searching the training samples for all pairs of samples with different labels.

In another photometric invariant self-dissimilarity matching (PISM) arrangement, a fixed number of negative training pairs such as, for example, five times the number of positive training pairs may be randomly generated at step 750. For example, the pairs of training samples may be selected at random (with replacement) from amongst the training samples received at step 705. A selected pair of training samples is added to a collection of negative training pairs, provided the negative training pairs has dissimilar labels and is not already in the collection. Sampling is repeated until the desired number of negative training pairs is found.

Control then passes from step 750 to distance metric determining step 760, where a distance metric, used to determine the distance between the appearance signatures of the object of interest and a candidate object, is determined in one implementation of step 470 of method 400. In one photometric invariant self-dissimilarity matching (PISM) arrangement, a linear transformation matrix M as used in the Mahalanobis distance metric defined by Equation (5) is determined at step 760 using Equations (6) and (7). In determining Equations (6) and (7), $S_{P,i}$ and $S'_{P,i}$, i=1, 2, ..., n represent pairs of appearance signatures of the n positive training pairs determined at step 740, and $S_{N,j}$ and $S'_{N,j}$, j=1, 2, ..., m, represent pairs of appearance signatures of the m negative training pairs determined at step 750. In another photometric invariant self-dissimilarity matching (PISM) arrangement, the linear transformation matrix M is determined using 'Large Margin Nearest Neighbour (LMNN) metric learning' based on the positive and negative training pairs determined at steps 740 and 750. Other Mahalanobis distance metric learning methods may equally be practiced in alternative implementations of step 760. The distance metric determined at step 760 may be stored in memory 206 by the processor 205. Method 700 concludes at the completion of step 760.

Figure 8:
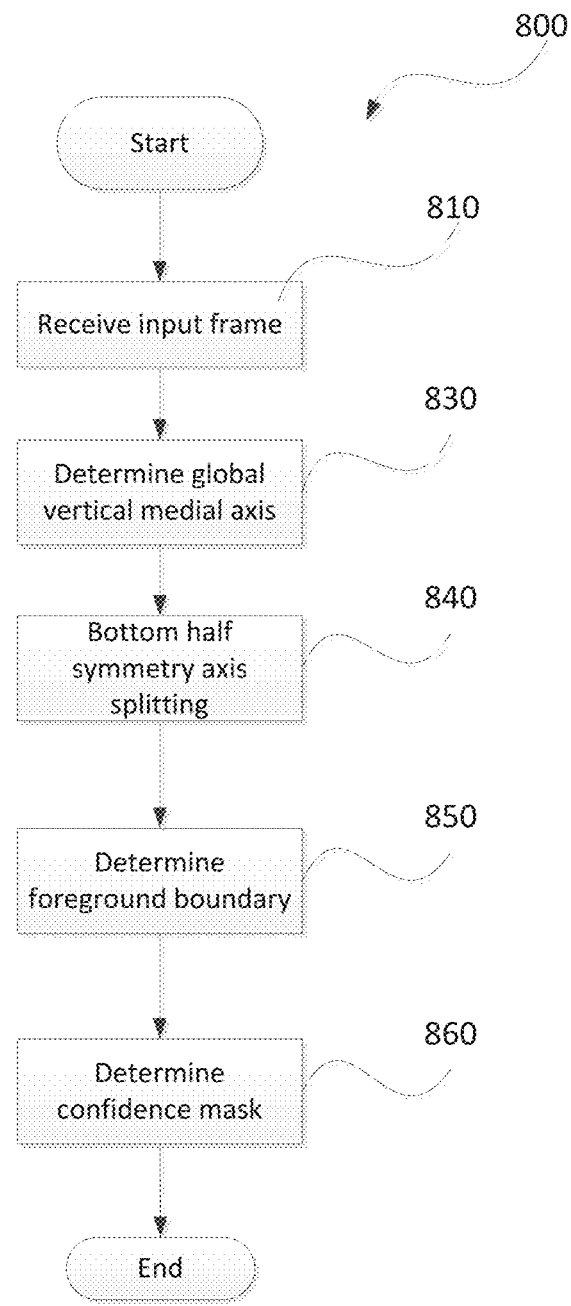
FIG. 8 is a schematic flow diagram showing a method of determining a confidence mask, as executed in the method of FIG. 5.

The method 800 of determining a foreground confidence mask, as executed at step 510 of method 500, will now be described with reference to FIG. 8. The method 800 may be implemented as one or more software code modules of the software application program 233 resident in the hard disk drive 210 and being controlled in its execution by the processor 205. The method 800 determines a foreground confidence mask that assigns to each pixel in an image region a value indicating a confidence that the pixel belongs to an object. Method 800 determines a foreground confidence mask based on an axis of symmetry of the object, also called a "medial axis" in the following description. In one photometric invariant self-dissimilarity matching (PISM) arrangement, the determined foreground confidence mask is used to determine a weighted cumulative distribution at step 530 of method 500.

Figure 15:
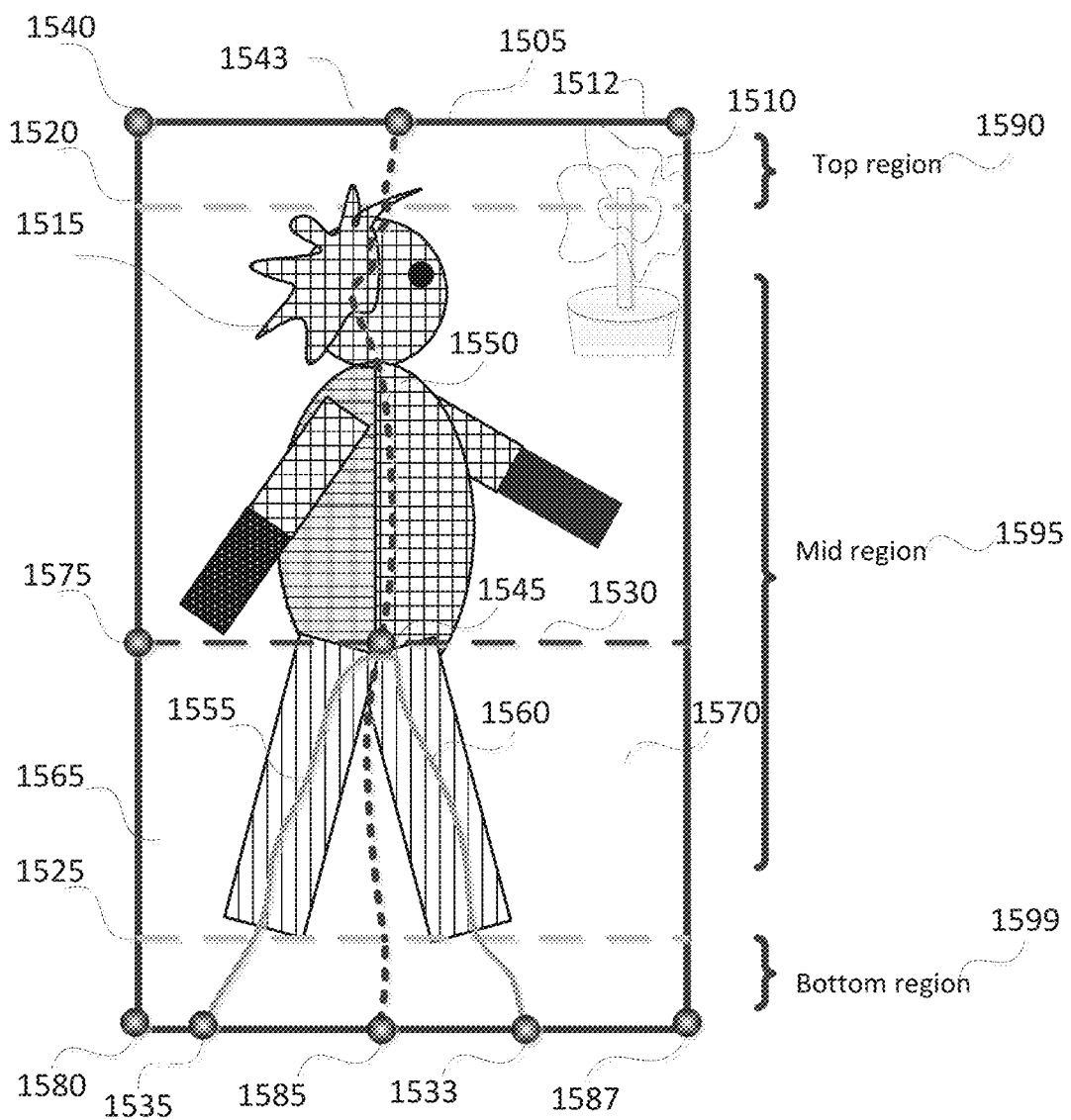
FIG. 15 is a schematic diagram showing medial axis paths for a given target object.

The method 800 will be described by way of example with reference to an image 1505 of a person 1515 as illustrated in FIG. 15. In one PISM arrangement, the image 1505 corresponds to an image region within a bounding box detected at step 410 of method 400. As described below, the image 1505 may be divided into multiple adjoining regions, each region having a medial axis. As also described, the medial axes of adjoining regions may be connected via a pixel bound at boundaries of the adjoining regions.

The method 800 begins at receiving step 810, where the input image 1505 is received under execution of the processor 205. The received input image 1505 may be stored in the memory 206 by the processor 205.

The method 800 then proceeds from step 810 to medial axis determining step 830. At step 830, a vertical medial axis of the target object 1515 within the input image 1505 is determined under execution of the processor 205. The vertical medial axis enforces a continuous path. The vertical medial axis is determined between the top row (i.e., a first vertical bound) and the bottom row (i.e., a second vertical bound) of the input image 1505. One method of determining the medial axis at step 830 is to determine a maximum cost path between the top and bottom of a cost image determined from the input image 1505. In one arrangement, dynamic programming is used to determine the maximum cost path. A method 900 of determining the vertical medial axis, as executed at step 830, will be described below with reference to FIG. 9. The vertical medial axis determined at step 830 may be stored in the memory 206 by the processor 205.

The method 800 then proceeds from step 813 to splitting point step 840, where a symmetry axis splitting point (or simply "split point") at torso-legs junction of the target object 1515 is determined under execution of the processor 205. Two additional medial axis paths starting from the split point to the bottom of the input image 1505 are also determined at step 840. The additional medial axes go through the middle of the legs of the person represented by the target object 1515. A method 1600 of determining medial axis paths at the bottom half of a target object, as executed at step 840, will be described below with reference to FIG. 16. The split point determined at step 840 may be stored in the memory 206 by the processor 205.

Next, at determining step 850, the foreground boundary of the input image 1505 is determined based on the medial axes determined at step 840. The foreground boundary defines a foreground mask, which contains only the object 1515, not the background. The foreground mask is determined at step 850 using the foreground boundary is a foreground mask of the object 1515. A method 1700 of determining the foreground boundary of the target object 1515, as executed at step 850, will be described below with reference to FIG. 17. The foreground determined at step 850 may be stored in the memory 206 by the processor 205.

The method 800 concludes at confidence value determining step 860, where a confidence value for each pixel in the foreground mask is determined to form a foreground confidence mask. The foreground confidence mask is determined at step 860 using the confidence value. The confidence value for each pixel may be referred to as a "confidence score". The foreground confidence mask determined at step 860 may be stored in the memory 206 by the processor 205.

Figure 9:
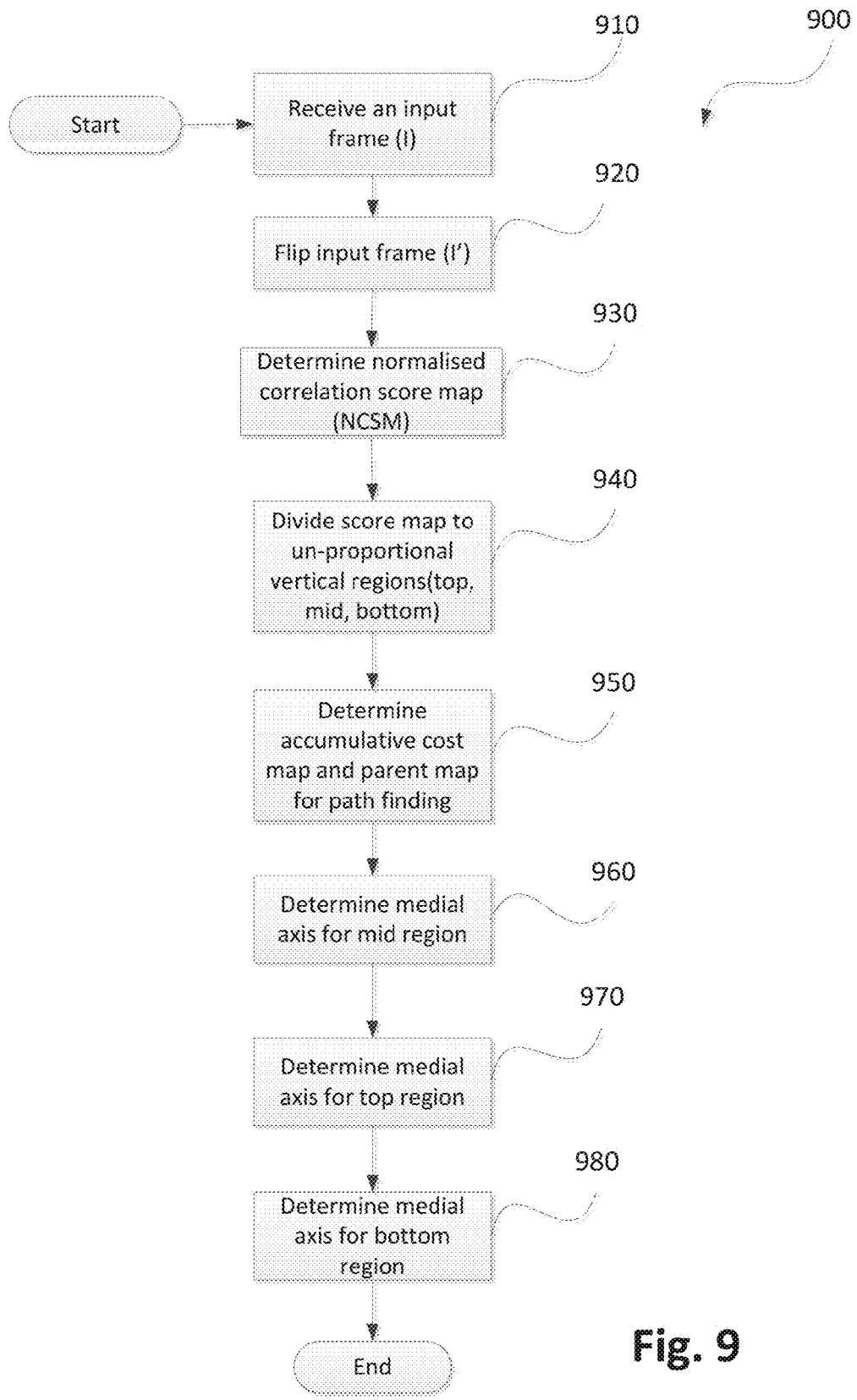
FIG. 9 is a schematic flow diagram showing a method of determining a vertical medial axis, as executed in the method of FIG. 8.

The method 900 of determining a vertical medial axis of the target object, as executed at step 830, will now be described with reference to FIG. 9. In the arrangement of FIG. 9, the method 900 uses dynamic programming. As described below, each pixel on the vertical medial axis is associated with a confidence score being a normalised cross correlation score for a corresponding image row.

The method 900 may be implemented as one or more code modules of the software application program 233 resident in the hard disk drive 210 and being controlled in its execution by the processor 205. The method 900 will be described by way of example with reference to the target object 1515 within the input image 1505.

The method 900 begins at receiving step 910, where the input image 1505, in a suitable colour space, is received by the processor 205. In one arrangement, the input image 1505 is pre-processed in an opponent colour space to have zero mean per colour channel and a reduced luminance compared to chrominance. For example, the colour space used at step 910 is a de-correlated or opponent colour space, such as the CIE Lab or YCbCr colour space, so that each channel of the colour space can be manipulated separately without affecting other channels.

The luminance channel Y of the colour space used at step 910 is divided by eight to reduce the effect of lighting change during target matching. Dividing the luminance channel Y of the colour space by eight also effectively boosts the contribution of the chrominance channels Cb and Cr in target matching. Colours may be used for matching across images. The colour channels of the colour space used at step 910 are zero-mean for normalised cross correlation.

For a better focus of a subsequent correlation step on the target object, the zero-mean input intensities can be optionally modulated (i.e. multiplied) by an object localisation weight. The input image 1505 may be pre-processed by modulating the input image 1505 by an object localisation weight to emphasise the processing on the object foreground object. The non-negative object localisation weight may be high (i.e. close to 1) where the foreground object is located in the input image. The non-negative object localisation weight may be low (i.e. close to 0) at the background pixels of the input image. Such object localisation weight may be derived from a human body detection step or head detection step for a human target. For example, to enable a medial axis to go through the head of a person, the top 20% image rows of the input image (e.g., the image 1505) containing a representation of the person are multiplied with the output of a skin colour detector. The skin colour detector outputs a probability of skin $0 \leq Pr(skin) \leq 1$ at each pixel in the image. After colour transformation, intensity normalisation, and object localisation weighting of the input image 1505, a pre-processed input image I is created at step 910. The pre-processed input image I determined step 910 may be stored in the memory 206 by the processor 205.

Figure 10:
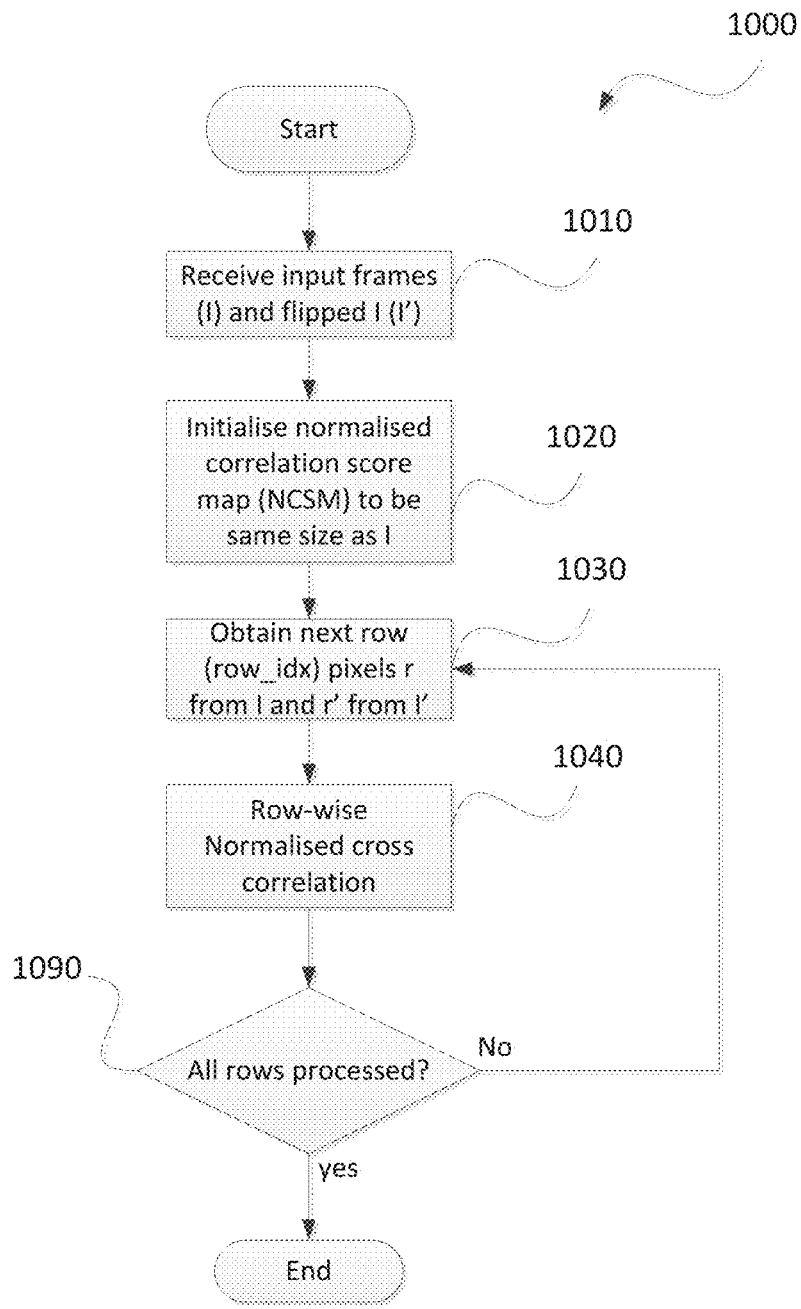
FIG. 10 is a flow diagram showing a method of determining a normalised cross correlation score map (NCSM), using row-wise normalised cross correlation of a target object, as executed in the method of FIG. 9.

Then at flipping step 920, the input image I created at step 910 is horizontally flipped, resulting in a flipped image I'. At determining step 930, a normalised cross-correlation score map (NCSM) is determined for the image I and the flipped image I', under execution of the processor 205. A method 1000 of determining a normalised cross correlation score map (NCSM), as executed at step 930, will be described in detail below with reference to FIG. 10. The normalised cross correlation score map (NCSM) is determined by performing a row-wise normalised cross correlation. The determined normalised cross correlation score map (NCSM) may be stored in memory 206 by the processor 205.

The method 900 then proceeds from step 930 to dividing step 940. At step 940, the normalised cross-correlation score map (NCSM) is virtually divided up into a number of vertical regions using a set of vertical bounds. In one arrangement, first and second vertical bounds are determined at step 940. The vertical bounds are determined within the image 1505. As described below, each of the vertical bounds may be a whole image row of the image 1505 or a single pixel on the image row of the image 1505.

Figure 13:
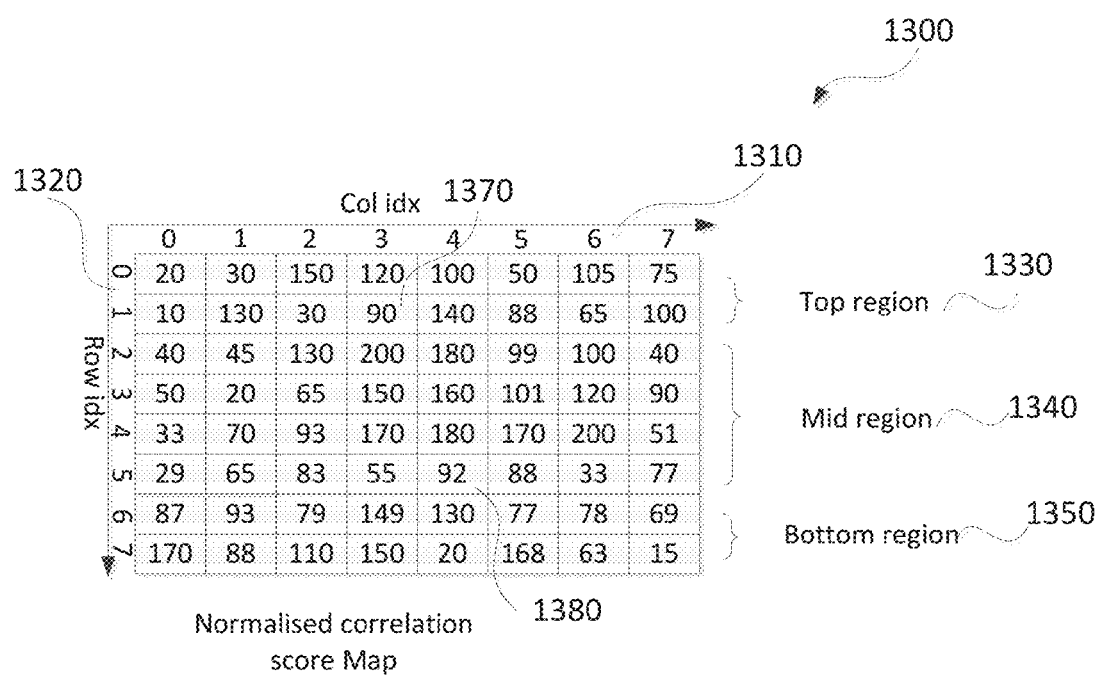
FIG. 13 shows an example normalised correlation score map.

In an arrangement where first and second vertical bounds are determined, the number of vertical regions of the normalised cross-correlation score map is three (3), where the vertical regions are named top, middle and bottom regions, accordingly. As an example, FIG. 13 shows a normalised cross correlation score map (NCSM) 1300 with eight (8) rows 1320 and eight (8) columns 1310 determined for the image 1505 of FIG. 15. The normalised cross correlation score map (NCSM) 1300 comprises a matrix 1370 of values with each value representing a correlation score. The values in matrix 1370 are examples of output of the normalised cross correlation score map (NCSM) determining step 930. Each of the values in matrix 1370 of the map 1300 is a measure of horizontal symmetry for each pixel of the image I determined for the image 1505. The horizontal symmetry measure for pixels on an image row of the image I is a normalised cross correlation of the image row with a horizontally flipped version of the image row from the flipped image I'.

The matrix 1370 of the normalised cross correlation score map (NCSM) 1300 is shown to be divided up into a top region 1330, middle region 1340 and bottom region 1350, as at step 940, with each of the regions 1330, 1340 and 1350 having a corresponding region 1590, 1595 and 1599, respectively, in the image 1505. The middle region 1340 of the normalised cross-correlation score map 1300 contains values for a majority portion of the target object (or object of interest) 1515 within middle region 1595 of the input image 1505. For example, middle region 1595 of the image 1505, as shown in FIG. 15, contains a majority portion of the target object (or object of interest) 1515. The top region 1330 and bottom region 1350 of the normalised cross-correlation score map (NCSM) 1300 contain values for the top region 1590 and bottom region 1599, respectively, of input image 1505. The top region 1590 and bottom region 1599 of input image 1505 correspond to uncertainty regions of the image 1505. In an uncertainty region, such as region 1590, the region is considered to contain mostly background, such as a top part of flower 1510 in image 1505.

Since the middle region 1595 of the image 1505, for example, contains the target object 1515, an estimate of the symmetrical axis of the object 1515 within the middle region 1595 is more likely to be correct. The symmetrical axis or medial axis can then be extended from the middle region 1505 to the top region 1590 and bottom region 1599. One method of determining the proportion of the image 1505 defining the middle region 1595 is to use heuristic values. For example, the middle region 1595 of the input image 1505 occupies 80% of the input image 1505, while the top region 1590 and bottom region 1599 occupies 10% of the input image 1505, respectively. Using such example heuristic values, the first vertical bound described above is the image row at the 10% image height location of image 1505, and the second vertical bound described above is the image row at the 90% image height location of image 1505.

Figure 14A:
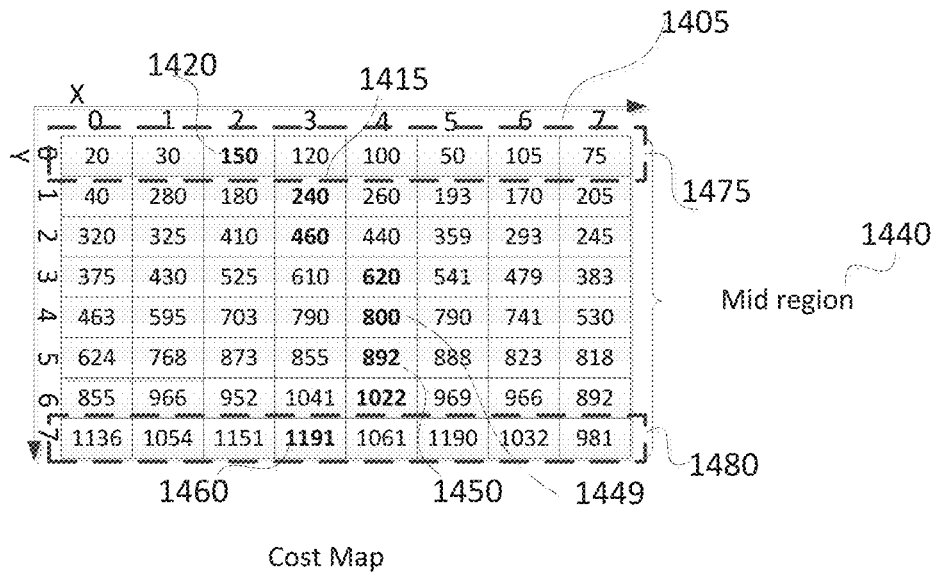
FIG. 14A is a schematic diagram showing an accumulated cost map.
Figure 14B:
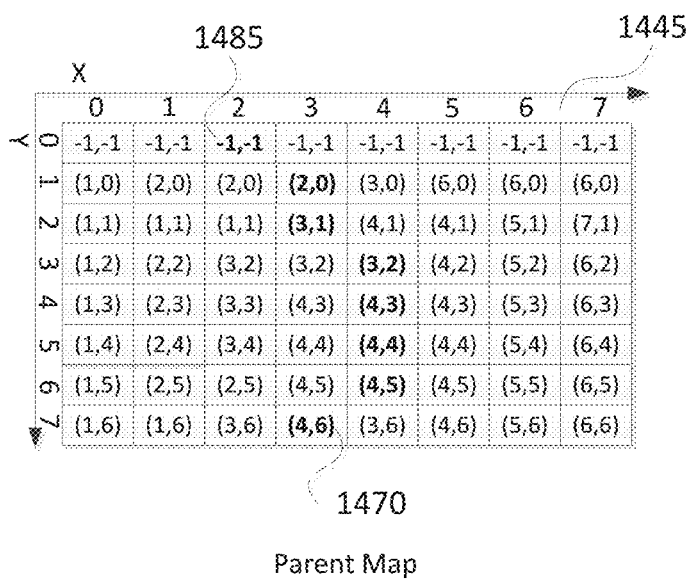
FIG. 14B is a schematic diagram showing a parent map.

Then at determining step 950, an accumulated cost map (ACM) and parent map (PM) are determined from the normalised cross-correlation score map (NCSM) 1300, in a top down fashion, under execution of the processor 205. The accumulated cost map (ACM) and parent map (PM) are determined using row wise normalised cross correlation of a target object. FIGS. 14A and 14B shows an accumulated cost map 1405 and parent map 1445, respectively, determined from the normalised cross-correlation score map (NCSM) 1300. A method 1100 of determining an accumulated cost map (ACM) and parent map (PM), as executed at step 950, will be described in detail below with reference to FIG. 11. The accumulated cost map (ACM) and parent map (PM) determined at step 950 may be stored in the memory 206 by the processor 205.

The method 900 then proceeds from step 950 to determining step 960, where the cost path in the middle region 1595 of the input image 1505 is determined using the accumulated cost map (ACM) 1405 and parent map (PM) 1445 determined at step 950. The cost path represents a medial axis for the middle region 1595 of the input image 1505. The cost path is a continuous path that sums up to a maximum total symmetry measure in the normalised cross-correlation score map (NCSM) 1300. A method 1200 of determining a path, as executed at step 960, will be described in detail below with reference to FIG. 12. The cost path determined at step 960 may be stored in the memory 206 by the processor 205. Steps 950 and 960 may be collectively referred to as maximum cost path finding using dynamic programming. Then at determining step 970, the medial axis of the middle region 1595 of the image 1505 is extended to cover the top region 1590 of the image 1505.

The method 900 concludes at determining step 980, where the medial axis of the middle region 1595 of the image 1505 is extended to cover the bottom region 1599 of the image 1505.

The method 1000 of determining the normalised cross correlation score map (NCSM) 1300, as at step 930, by performing a row-wise normalised cross correlation will now be described. As described above, the normalised cross correlation score map (NCSM) 1300 contains values representing a measure of horizontal symmetry for each pixel of an image. A continuous path summing up to a maximum total symmetry measure, is determined from the map 1300, the continuous path representing a medial axis. The method 1000 may be implemented as one or more code modules of the software application program 233 resident in the hard disk drive 210 and being controlled in its execution by the processor 205.

The method 1000 begins at step 1010, where the two input images: input image I and the flipped image I' determined for the image 1505 are received. The two input images I and I' may be accessed from the memory 206, for example, under execution of the processor 205.

At initialising step 1020, the normalised cross correlation score map (NCSM) is initialised to the same size (i.e., the same width by height) as the input images I and the flipped image I', under execution of the processor 205. All values in the normalised cross correlation score map (NCSM) are set to the value zero (0) at step 1020. Next, at obtaining step 1030, the next row of pixel values r from image I and image r' from flipped image I' are obtained. The row pixel values obtained at step 1030 are characterised by a row index variable, row_idx.

At determining step 1040, row-wise normalised cross correlation scores are determined from the pixel values of r from image I and pixel value r' flipped image I' using Equation (9), as follows:

$$\frac{r*r'}{\sqrt{\sum (r)^2 \times \sum (r')^2}} = \frac{r*r'}{\sum (r)^2} \quad (9)$$

where the numerator of Equation (9) determines the cross correlation (denoted with symbol *) between input row r from image I and row r' from image I'. In the denominator of Equation (9), since values in row r' is a horizontal flip of row r, the normalisation value $\sqrt{\Sigma(r)^2 \times \Sigma(r')^2}$ is the same as $\Sigma(r)^2$ (where $\Sigma$ denotes sum of values over the row).

The row-wise normalised cross correlation scores determined at step 1040, have the same number of elements as row r, and are copied into the normalised cross-correlation score map at NCSM [row_idx] which may be configured within the memory 206.

Next, the method 1000 proceeds to decision step 1090, where if all rows in image I and flipped image I' are processed (i.e., yes), then the method 1000 of determining the normalised cross correlation score map concludes. Otherwise (i.e., no), the method 1000 returns to step 1030.

Figure 11:
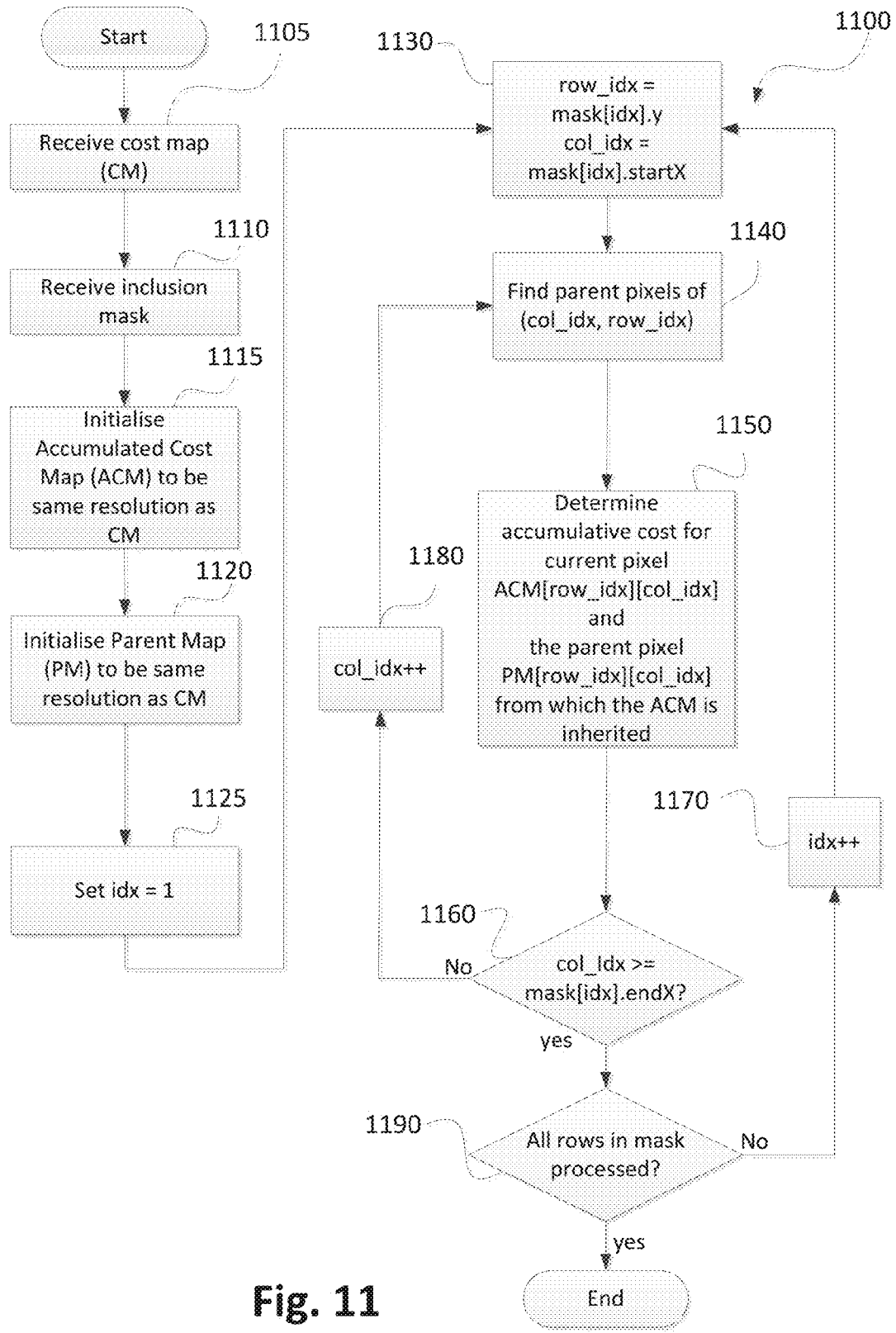
FIG. 11 is a flow diagram showing a method of determining an accumulated cost map (ACM) and parent map (PM), as executed in the method of FIG. 9.

The method 1100 of determining an accumulative cost map (ACM) and parent map (PM), as executed at step 950, will be described in detail below with reference to FIG. 11. The method 1100 may be implemented as one or more code modules of the software application program 233 resident in the hard disk drive 210 and being controlled in its execution by the processor 205. The method 1100 will be described by way of example with reference to the two dimensional image normalised cross-correlation score map (NCSM) 1300 of FIG. 13, the accumulated cost map (ACM) 1405 of FIG. 14A and the parent map (PM) 1445 of FIG. 14B.

The method 1100 determines the accumulated cost map (ACM) 1405 and corresponding parent map (PM) 1445 given a cost map and an inclusion mask as inputs. In the example of FIGS. 14A and 14B, the input cost map is the two dimensional image normalised cross-correlation score map (NCSM) 1300, which was determined in step 930. An inclusion mask for the cost map 1300 describes a region of interest upon the cost map 1300. For example, the inclusion mask can be a rough segmentation of the target object (or foreground object) in the input image. If such foreground segmentation is not available, the inclusion mask assumes the whole image. In one arrangement, the inclusion mask is represented as an array of row index paired with a start column index and an end column index. For example, mask=[[1, 1, 10], [2, 3, 15]] describes an inclusion mask with two rows, row one (1) and row two (2). Within row one (1), the columns between one (1) and ten (10) are within the region of interest, i.e. mask[1]=[1, 1, 10]. Within row two (2) (called Y value), the region of interest span from column three (3) (called startX) to column fifteen (15) (called endX): mask[2]=[2, 3, 15] or mask[2].Y=2, mask[2].startX=3, mask[2].endX=15.

The method 1100 begins at receiving step 1105, where the cost map (CM) 1300 is received under execution of the processor 205. The received map 1300 may be stored in the memory 206 by the processor 205. Then at receiving step 1110, an inclusion mask is received under execution of the processor 205. Again the inclusion mask may be stored in the memory 206 by the processor 205.

The method 1100 then proceeds to initialising step 1115, where a 2-dimensional image, representing the accumulated cost map (ACM) 1405, is initialised under execution of the processor 205. All values in the accumulated cost map (ACM) 1405 are initialised to a small numerical value, for example, zero (0). The accumulated cost map (ACM) 1405 is initialised to be at the same resolution as the cost map (CM) 1300 received at step 1105. The initialised accumulated cost map (ACM) 1405 may be stored in the memory 206 by the processor 205.

The method 1100 then proceeds to initialising step 1120, where a 2-dimensional image, representing the parent map (PM) 1445, is initialised under execution of the processor 205. The parent map (PM) is initialised to be at the same resolution as the cost map (CM) 1300 received at step 1105. The initialised parent map (PM) 1445 may be stored in the memory 206 by the processor 205. Both the accumulated cost map 1405 and parent map 1445 have the same size as the cost map 1300. All values in the parent map 1445 are initialised to coordinates (−1, −1).

The accumulated cost map 1405 records the total cost along a continuous maximum-cost path from top row to the current pixel location on the cost map (CM) 1300. For example, as seen in FIG. 14A, the accumulated cost map 1405 comprises a value eight hundred and ninety two (892) at matrix cell 1450, indicating that the accumulative cost along a maximum-cost path from row 0 to the current pixel (as represented at matrix cell 1450) in row five (5) is eight hundred and ninety two (892). The accumulated cost values along the continuous maximum-cost path from row 0 to the current pixel in row five (5) are shown in bold, starting from pixel (2,0) to (3,1), (3,2), (4,3), (4,4), to the current pixel (4,5). The continuous maximum-cost path runs between the first and second vertical bounds described above, with the continuous maximum-cost path representing the vertical medial axis of the object 1515 for the example image 1505. The continuous maximum-cost path sums up to a maximum total symmetry measure for the cost map (CM) 1300.

The parent map (PM) 1445 records the pixel location of a pixel on the previous row that precedes the current pixel on the maximum-cost path. For example, the current pixel as represented by matrix cell 1450 in FIG. 14A has pixel location (4,5) as seen in FIG. 14B and an accumulated cost value of eight hundred and ninety two (892) as seen in FIG. 14A. The preceding pixel along the maximum-cost path (i.e., as represented by the bold numbers in FIG. 14A) has location (4,4) as seen in FIG. 14B.

The accumulated cost at the current pixel represented by matrix cell 1450 equals the summation of the accumulated cost at the parent pixel represented by matrix cell 1449 and the cost at the current pixel as represented by matrix cell 1380 in the normalised correlation score map (NCSM) 1300 is as follows:

892=800+92.

Referring back to FIG. 11, the determination of the accumulative cost and parent pixel location for all pixels within the inclusion mask, continues at initialisation step 1125. At step 1125, variable idx (e.g., configured in memory 206) is initialised to the value one (1) under execution of the processor 205. Then at initialisation step 1125, variable row_idx is set to mask[idx].y and col_idx is set to mask[idx].startX under execution of the processor 205.

The method 1100 then proceeds to finding step 1140, where potential parent pixels of a given pixel coordinate (col_idx, row_idx) are found under execution of the processor 205. In one arrangement, the potential parent pixels are three (3) adjacent pixels on the previous row as follows:

parent[0]=(col_idx−1,row_idx−1), parent[1]=(col_idx,row_idx−1), and parent[2]=(col_idx+1,row_idx−1).

Pixel parent[1] is referred to as the direct or vertical parent and pixel parent[0] and pixel parent[2] are referred to as indirect or diagonal parents. The continuous path from pixel parent[1] to the current pixel is called a vertical move, while the continuous path from pixel parent[0] or pixel parent[2] to the current pixel is referred to as a diagonal move.

The method 1100 continues at determining step 1150, where the accumulative cost for the current pixel (col_idx, row_idx) and the parent pixel which contributes to the accumulative cost is determined under execution of the processor 205. The accumulative cost determined at step 1150 may be stored in the memory 206 by the processor 205. In one arrangement, the accumulative cost for the current pixel is a sum of the accumulated cost of the parent pixel and the value in the cost map at the current pixel. For example, in FIG. 14A, the pixel represented by matrix cell 1415 at location (3,1) (as seen in FIG. 14B) has a parent pixel represented by matrix cell 1420. The parent pixel represented by matrix cell 1420 has a maximum value of one hundred and fifty (150) for parent pixel 1420 at location (2,0). Hence, the accumulated cost at matrix cell 1415 is the sum of the accumulated cost at matrix cell 1420 and the cost for the current pixel represented by matrix cell 1370 is as follows:

240=150+90.

In another arrangement, Equation (10), as follows, is used to determine the accumulated cost values:

$$ACM[r][c] = \max \begin{cases} ACM[\text{parent}[0]] + CM[r][c] * \text{weight\_indirect} \\ ACM[\text{parent}[1]] + CM[r][c] * \text{weight\_direct} \\ ACM[\text{parent}[2]] + CM[r][c] * \text{weight\_indirect} \end{cases} \quad (10)$$

where r represents row_idx and c represents col_idx. ACM[parent[i]] represents the accumulated cost at parent pixel parent[i] (i=0, 1, 2). The weights, weight_direct and weight indirect, indicate how much the cost at the current pixel influence the accumulated cost for the current pixel.

In one arrangement, weight_direct=1.3604 and weight indirect=0.9619, which favour a direct path by giving the direct path a higher weight than a diagonal path. An arrangement which gives the direct path a higher weight than a diagonal path encourages the maximum-cost path to comprise of more vertical moves than diagonal moves.

At step 1150, the value in the parent map, PM[row_idx][col_idx], is set to the pixel location of the parent pixel corresponding to the maximum value in Equation (10), under execution of the processor 205.

Next, the method 1100 proceeds from step 1150 to decision step 1160, where if the edge of the inclusion mask for the current row has been reached (i.e., yes), then the method 1100 proceeds to decision step 1190. Otherwise (i.e., no), the method 1100 proceeds to incrementing step 1180, where variable col_idx is incremented by one (1). The method 1100 then returns to step 1140 following step 1180.

At decision step 1190, if all rows in the inclusion mask have been processed (i.e., yes), then the method 1100 concludes. Otherwise (i.e., no), the variable, idx, is incremented by one (1) at incrementing step 1170. Following step 1190, the method 1100 loops back to step 1130.

Figure 12:
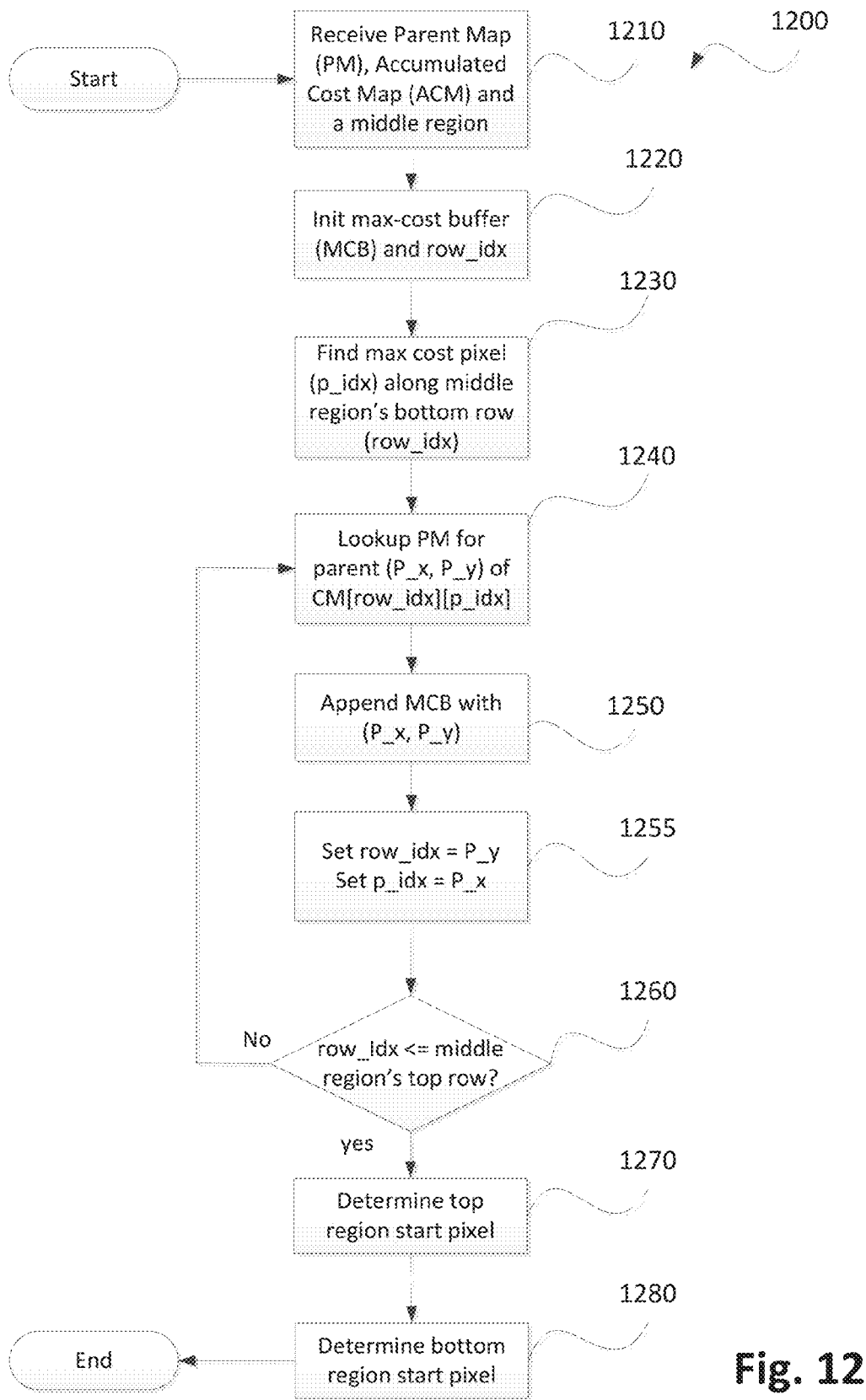
FIG. 12 is a flow diagram showing a method of determining an optimal path in a section of an image.

The method 1200 of determining a cost path, as executed at step 960, will now be described with reference to FIG. 12. The method 1200 determines the maximum-cost path from the accumulated cost map determined at step 950. The method 1200 may be implemented as one or more code modules of the software application program 233 resident in the hard disk drive 210 and being controlled in its execution by the processor 205.

The method 1200 will be described by way of example with reference to the accumulated cost map 1405 of FIG. 14A and the parent map 1445 of FIG. 14B. In the example of FIGS. 14A and 14B, the method 1200 searches the maximum-cost path given an upper and lower bound in the accumulated cost map 1405.

The method 1200 begins at receiving step 1210, where the accumulated cost map 1405, the parent map 1445, an upper bound 1475 and lower bound 1480 of the middle region 1440 are received under execution of the processor 205. The accumulated cost map 1405, the parent map 1445, an upper bound 1475 and lower bound 1480 of the middle region 1440 may be accessed by the processor 205 at step 1210, for example, from memory 206. The upper bound 1475 in the accumulated cost map 1405 corresponds to the upper bound 1520 in the image 1505. Similarly, the lower bound 1480 in the accumulated cost map 1405 corresponds to the lower bound 1525 in the image 1505; and the middle region 1440 in the accumulated cost map 1405 corresponds to the middle region 1595 in the image 1505.

Then the method 1200 proceeds to initialising step 1220, where a max-cost buffer (MCB) configured within the memory 206 is initialised to empty. The max-cost buffer (MCB) is configured for storing the collection of pixels along the maximum-cost path between the upper bound 1475 and the lower bound 1480. Also at step 1220, a current row index variable, row_idx, configured within memory 206 is initialised with the row index of the lower bound 1480.

The method 1200 then proceeds from step 1220 to finding step 1230. At step 1230, a pixel with the maximum accumulated cost along the current row row_idx, is found under execution of the processor 205. For example, the pixel represented by matrix cell 1460 with value one thousand-one hundred and ninety one (1191) on row_idx=7 in the accumulated cost map 1405 seen in FIG. 14A. The location of the maximum accumulated cost map (ACM) pixel is added to the max-cost buffer (MCB) configured within memory 206. Next, the method 1200 proceeds to lookup step 1240, where a lookup is performed in the parent map 1445 for the parent of the maximum accumulated cost map (ACM) pixel. For the current row_idx=7, the parent location is shown in matrix cell 1470 of in FIG. 14B. The matrix cell 1470 contains the coordinate value (4,4), which suggests (4,4) is the parent pixel of the pixel represented in matrix cell 1460 in the cost map 1405.

The method 1200 then proceeds from step 1240 to appending step 1250, where the max-cost buffer (MCB) is appended, under execution of the processor 205, with the parent pixel coordinate of matrix cell 1470. Next, the method 1200 proceeds from step 1250 to setting step 1255, where the current variables, row_idx and p_idx, are set to be the parent pixel coordinate P_x and P_y, found in step 1250. Then at decision step 1260, if the upper bound 1475 is reached (i.e., yes), then the method 1200 proceeds to step 1270. Otherwise (i.e, no), the method 1200 returns step 1240.

If all rows in the region of the accumulated cost map (ACM) 1405 (i.e. the middle region 1440 in the example of FIG. 14A) are processed, then the path finding process is completed. An example of a resulting continuous path in the example of FIGS. 14A and 14B is illustrated in bold font in FIG. 14B from matrix cell 1470 to matrix cell 1485, which are coordinates: (4,6), (4,5), (4,4), (4,3), (3,2), (3,1), and (2,0).

Next, the method 1200 proceeds to from step 1260 to determining step 1270, where the start pixel for the top region 1590 of the image 1505 is determined under execution of the processor 205. Then, at determining step 1280 the start pixel for the bottom region 1599 of the image 1505 is determined under execution of the processor 205.

Steps 1270 and 1280 are performed to ensure the continuity of the medial axis path stemming from the middle region 1440 of the accumulated cost map (ACM) 1405 (i.e., corresponding to the middle region 1595 of the image 1505). The start pixel of the medial axis for the top region 1590 is the top pixel, as represented by matrix cell 1420, of the path of the middle region 1440. The start pixel of the medial axis for the bottom region 1599 is the bottom pixel, as represented by matrix cell 1460, of the path of the middle region 1440.

Now referring back to FIG. 9, in one arrangement, given the start pixels, at both steps 970 and 980, dynamic programming is used with the constraint to search the medial axis paths using the given start pixel (i.e., as represented by matrix cell 1420 and 1460), respectively. The medial axis 1550 is the concatenation of medial axis paths of the top 1590, middle 1595 and bottom 1599 regions.

Figure 16:
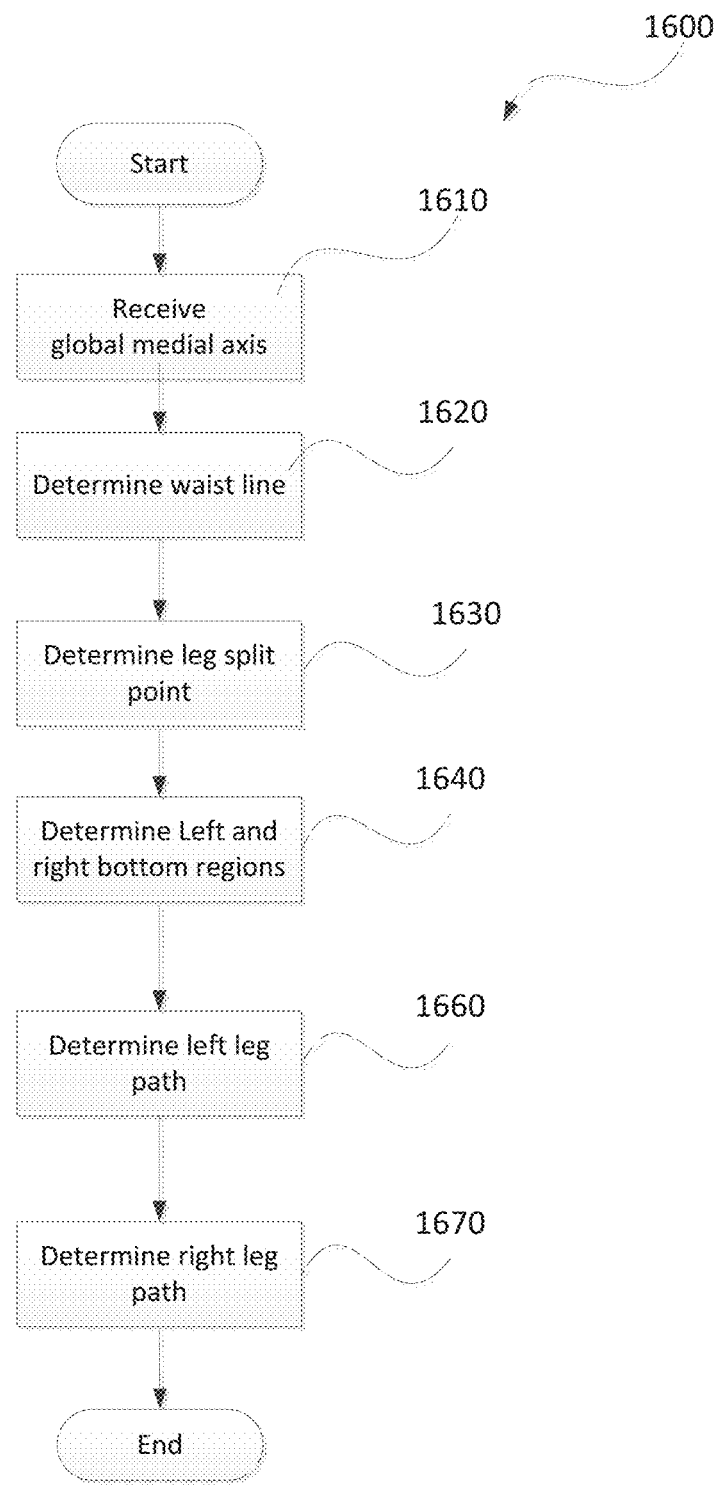
FIG. 16 is a flow diagram showing a method of determining medial axis paths at the bottom half of a target object, as executed in the method of FIG. 8.

The method 1600 of determining medial axis paths at the bottom half of a target object, as executed at step 840, will be described below with reference to FIG. 16. The method 1600 will be described by way of example with reference to the input image 1505. The method 1600 determines multiple medial axis paths for the bottom half of the input image 1505. The method 1600 may be implemented as one or more code modules of the software application program 233 resident in the hard disk drive 210 and being controlled in its execution by the processor 205.

The method 1600 begins at receiving step 1610, where the medial axis 1550 of the target object 1515 (i.e., the object of interest) which represents an upright person. Then, the method 1600 proceeds from step 1610 to determining step 1620, where a waist line level is determined for the target object 1515 under execution of the processor 205. The row number at the waist line level of the target object 1515 is also determined at step 1620. The waist line level is a horizontal line in the image 1505 (or image) that divides the image 1505 (or image) vertically to head-plus-torso region and legs region. In one arrangement, a heuristic value representing the head-torso region of the entire image (e.g.: 0.5) being 50%. For example, in an input image of an upright person, such as the image 1505, with size 128×48 pixels, the waist line level 1530 is expected to be at row sixty four (64). The determined waist line and row number determined at step 1620 may be stored in the memory 206 by the processor 205.

Next, at determining step 1630, intersection 1545 between medial axis 1550 and the waist line level 1530 is determined under execution of the processor 205. The intersection 1545 corresponds to the pixel location in the medial axis 1550 that has the same row number as the waist line level. The intersection 1545 may be referred to as the "bottom half splitting point" (or simply "split point"). The split point at the intersection of the waist line level 1530 with the medial axis 1550 is determined at step 1630.

The method 1600 then proceeds from step 1630 to determining step 1640, where the bottom half of the input image 1505 is further divided to left bottom region 1565 and right bottom region 1575. The left bottom region 1565 covers the area below the waist line 1575 and to the left of the medial axis 1550. In image 1505, the left bottom region 1565 is defined by the quadrilateral from four points 1575, 1545, 1585 and 1580. The right bottom half region 1570 covers the area below the waist line 1575 and to the right of the medial axis 1550.

Next, at determining step 1660, a medial axis for the left leg of the object 1515 is determined within the region 1565 from the split point 1545 down, under execution of the processor 205. The medial axis determined at step 1660 may be stored in the memory 206 by the processor 205. The left leg medial axis within the region 1565 is under a constraint that the left leg medial axis starts at the split point 1545 and ends at the bottom image row. The left leg medial axis is a continuous path between two vertical bounds, the continuous path representing the left leg medial axis. The first vertical bound is the split point, and the second vertical bound is the bottom image row. In one arrangement, a dynamic programming technique is used to determine the medial axis in left bottom region 1565.

The method 1600 then proceeds from step 1660 to determining step 1670. At step 1670, a medial axis for the right leg of the object 1515 is determined within region 1570 from the split point 1545 down. The right leg medial axis is a continuous path between two vertical bounds, the continuous path representing the right leg medial axis. The medial axis for the right leg of the object 1515 is determined using dynamic programming starting at the split point 1545. The medial axis determined at step 1670 may be stored in the memory 206 by the processor 206.

The medial axis for the left bottom region 1565 is referred to as a left leg path 1555 and the medial axis for the right bottom region 1575 is referred to as a right leg path 1560. The body medial axis together with the leg axes may be collectively referred to as the stickman axes for modelling a human figure with one-dimensional sticks.

The method 1700 of determining the foreground boundary of the target object, as executed at step 850, will be described below with reference to FIG. 17. The method 1700 determines the foreground boundary for the target object 1515 (or object of interest). The method 1700 may be implemented as one or more code modules of the software application program 233 resident in the hard disk drive 210 and being controlled in its execution by the processor 205.

Figure 18:
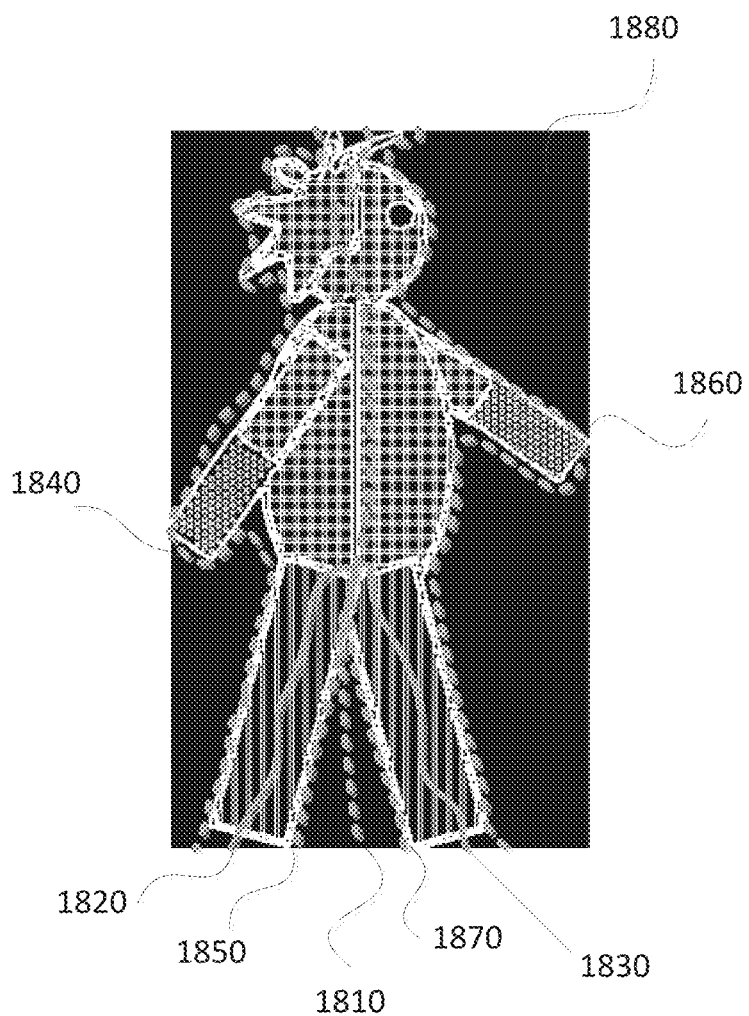
FIG. 18 is a schematic diagram showing an estimated foreground boundary of the target object of FIG. 15.

The method 1700 will be described by way of example with reference the input image 1505 and to gradient image 1880 of FIG. 18, which is a gradient image for the image 1505.

The method 1700 begins at determining step 1710, where an edge response image is determined for the input image 1505, under execution of the processor 205. In one arrangement, the edge response image may be in the form of a gradient image 1880, as shown for example in FIG. 18. The gradient image 1880 may be determined using any suitable method. The determined image 1880 may be stored in the memory 206 by the processor 205.

Next, the method 1700 proceeds to from step 1710 to receiving steps 1720 and 1730, where a set of medial axes of the object 1515 in the input image 1505 is received under execution of the processor 205. At receiving step 1720, the medial axis 1550 is received under execution of the processor 205. The medial axis 1550 determined at step 1720 may be stored in the memory 206.

The method 1700 then proceeds to receiving step 1730. At step 1730, a continuous path representing the medial axis of the left leg of the object 1515 is received under execution of the processor 205. The continuous path for the left leg is on the left side of the medial axis 1550. The continuous path for the left leg is determined between a first bound (i.e., split point 1545) and a second bound (i.e., bottom image row 1480), with the continuous path for the left leg summing up to a maximum total edge response. The continuous path representing the medial axis of the left leg of the object 1515 may be accessed at step 1730 by the processor 205 from the memory 206.

Also at step 1730, a continuous path representing the medial axis of the right leg of the object 1515 is received under execution of the processor 205. The continuous path for the right leg is on the right side of the medial axis 1550. The continuous path for the left leg is determined between the first bound (i.e., split point 1545) and the second bound (i.e., bottom image row 1480), with the continuous path for the right leg summing up to a maximum total edge response. The method 1700 then proceeds from step 1730 to receiving step 1740, where the split point 1545 is received under execution of the processor 205.

Next, at determining step 1760, a left body boundary is determined under execution of the processor 205. The left body boundary is the outline of the body of the object of interest 1515 (or person of interest) on the left hand side of the medial axis and the left leg path. To find the left body boundary, a search region on the gradient image is formed at step 1760. In FIG. 15, the search region used to determine the left body boundary at step 1760 is the polygon defined by five vertex points 1540, 1543, 1545 (i.e., the split point), 1535 and 1580. A maximum-cost path from top image row 1475 to bottom image row 1480, within the search region is determined as representing at least a portion of the left body boundary of the object 1515. The left body boundary of the object 1515 also represents a maximum total edge response. In one arrangement, dynamic programming is used to determine the left body boundary path, which is shown as the dotted line 1840 in FIG. 18.

Similarly, at determining step 1770, a right body boundary is determined under execution of the processor 205 and may be stored in the memory 206. The right body boundary is the outline of the body of the target object 1515 (or object of interest) on the right hand side of the medial axis 1550 and the right leg path. A search region for the right body region is formed at step 1770. In FIG. 15, the search region formed at step 1770 is the polygon defined by five vertex points 1543, 1512, 1587, 1533, and 1545. Next, a maximum-cost path from top image row 1475 to bottom image row 1480 within the search region formed at step 1770 is determined as representing at least a portion of the right body boundary of the object 1515. In one arrangement, dynamic programming is used to determine the right body boundary path, which is shown as the dotted line 1860 in FIG. 18. The maximum-cost path determined at step 1770 may be stored in the memory 206 by the processor 205.

Next, at determining step 1780, a left leg inner boundary is determined under execution of the processor 205. In the example of FIG. 18, the left leg inner boundary is the outline of the inner left leg between the left leg medial axis 1820 and the bottom part of the medial axis 1810. A search region for the inner left leg is formed at step 1780. In the example of FIG. 15, the search region is the triangular region defined by three points 1535, 1545 and 1585. A maximum-cost path is determined within the search region determined at step 1780 from the split point to the bottom image row. In one arrangement, dynamic programming is used to determine the inner left leg boundary path, which is shown as the dotted line 1850 in FIG. 18.

The method 1700 then proceeds from step 1780 to determining step 1790. At step 1790, the right leg inner boundary is determined under execution of the processor 205 and may be stored in the memory 206. The right leg inner boundary is the outline of the inner right leg between right leg medial axis 1830 and the bottom part of the medial axis 1810. A search region for the inner right leg is formed at step 1790. The search region determined at step 1790 is the triangular region defined by three points 1533, 1545 and 1585. Next, a maximum-cost path is determined within the search region determined at step 1790. In one arrangement, dynamic programming is used to determine the inner right leg boundary path, which is shown as the dotted line 1870 in FIG. 18.

Figure 17:
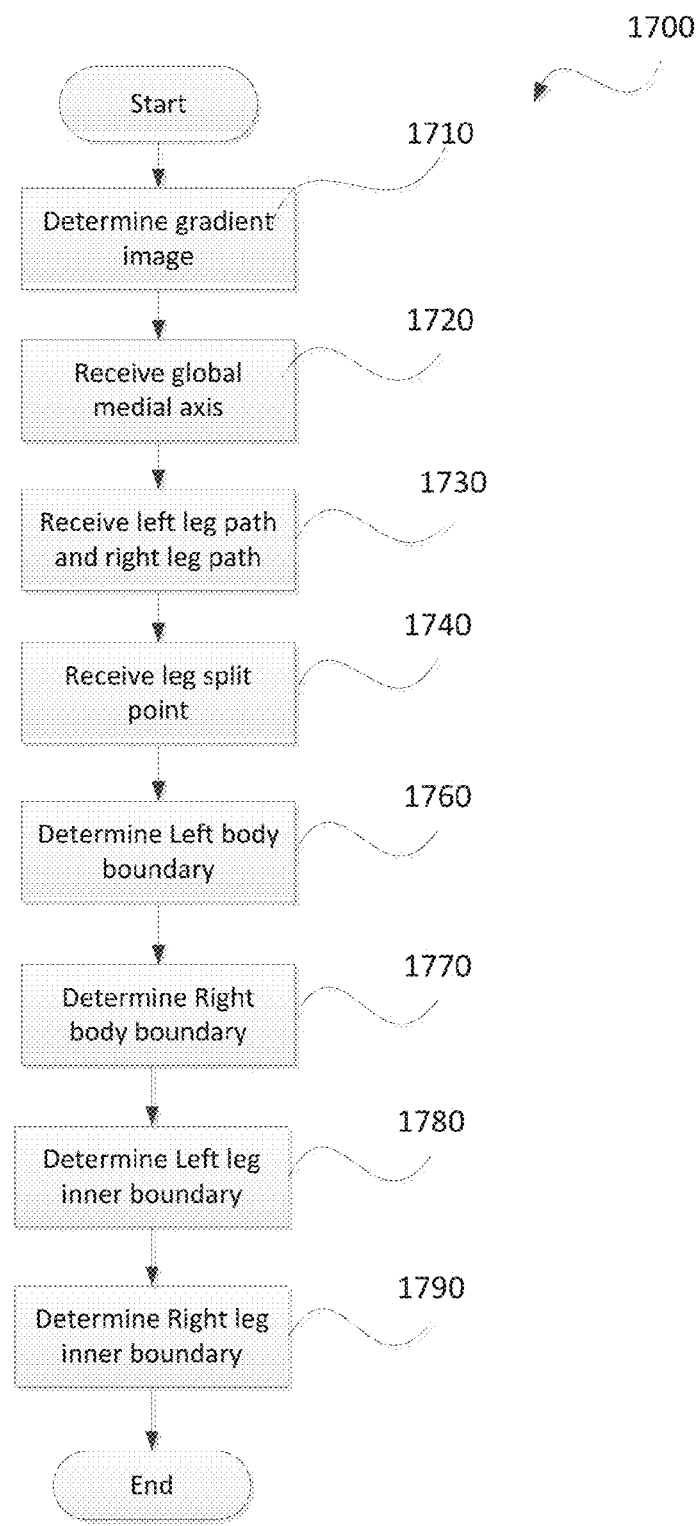
FIG. 17 is a flow diagram showing a method of determining the foreground boundary of a target object, as executed in the method of FIG. 8.
Figure 19:
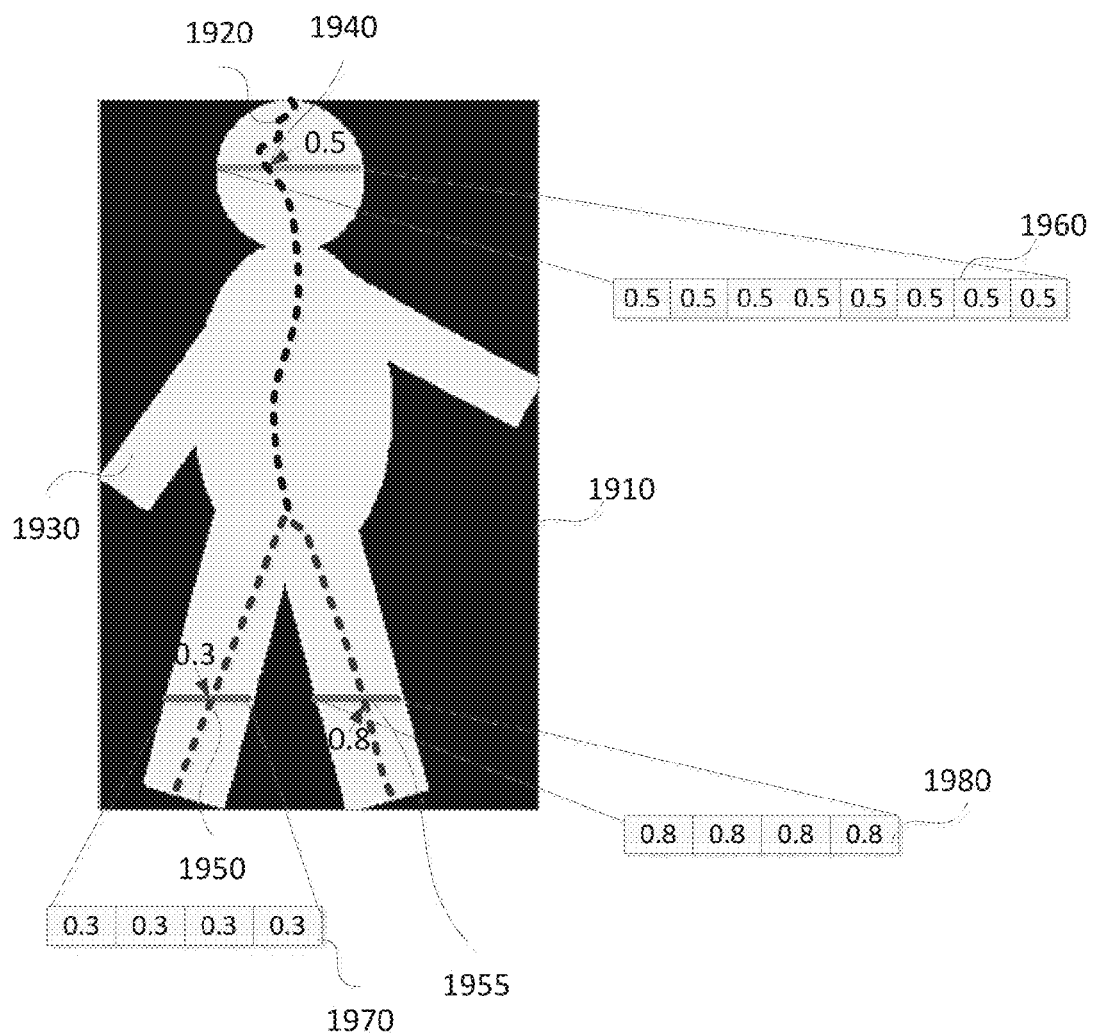
FIG. 19 is a schematic diagram showing the determined foreground boundary and confidence map of the target object of FIG. 15.

The foreground boundary (or "foreground mask") of the target object 1515 determined in the foreground boundary estimation method 1700 described in FIG. 17, is shown in FIG. 19. The white area 1930 of FIG. 19 represents the foreground mask of the object 1515 representing a person in the input image 1505. The black area of FIG. 19 represents background.

Now returning to FIG. 8, at step 860, confidence values for each pixel in the foreground mask 1930 are determined, as described above. The confidence values determined at step 860 may be stored in the memory 206 by the processor 205. In one arrangement, the confidence values for the entire row within the foreground mask 1930 are assigned to the normalised cross correlation (NCC) score for that row in the medial axis path. For example, in FIG. 19, the pixel location indicated by label 1940 on the medial axis 1920 has a normalised cross correlation (NCC) score 0.5 so the entire row 1960 within the foreground mask 1930 has the same value. Similarly, pixel locations 1950, 1960 have values 0.3 and 0.8, respectively. As a result, the entire row 1970 on the left leg region and the entire row 1980, as seen in FIG. 19, on the right leg region of the foreground mask 1930 has the value 0.3 and 0.8, respectively. As a result, each row in the foreground mask 1930 encodes a value between zero (0) and one (1) representing the confidence level of that row being foreground, if a normalised cross correlation (NCC) value is negative, the negative normalised cross correlation (NCC) value is reset to zero (0).

The described foreground confidence mask 1930 determined using medial axis explores the symmetry nature of foreground objects for target matching purposes. The target objects can be either rigid or non-rigid objects. The continuity of the medial axis paths provides robustness against pose and posture variation. The method of determining object medial axes as described above does not require a foreground mask a priori. The determined foreground mask encodes a confidence score per scan line, allowing the matching process to discriminate strong confident foreground areas from weak foreground areas in the foreground mask.

Target matching can be performed on the extracted medial axes and the confidence score (i.e. normalised cross correlation (NCC) score) along the extracted medial axes. Image colour values along the medial axis may be extracted to a medial axis profile. The medial axis profiles may then be resampled to a common scale to account for different scaling between the two target objects. Once at a common size, the medial axis profiles from different target objects can be compared either using sum of squared differences or by correlation. If the confidence scores along the medial axes are available, the confidence scores can be used as weights in a weighted sum of squared differences or weighted correlation.

Target matching can also be performed on a pose-normalised image of the target objects. Objects in multiple input images may be matched using pose-normalised images and foreground confidence masks. As can be seen in FIG. 19, body medial axis 1920 is generally curved along the human posture. The leg medial axes can also be non-symmetric about the body medial axis 1920 because each leg may be raised at different height during walking. Due to different poses, images of the same target may not match well when taking a sum of squared differences (SSE) or normalised cross correlation (NCC). To factor out differences in poses before target matching, the input images may be warped to a canonical pose or canonical formation. The described methods may be configured for translating each image row to align the medial axes for the left and right leg to a canonical pose or canonical formation. The canonical pose is characterised by a vertically straight body medial axis at the middle of the image. The leg medial axes are straight and symmetric about the body medial axis, each at a 10-degree angle with respect to the body medial axis. The canonical pose also has the leg split point at the same location, for example, at 50% height of the image. Images of the target object are also scaled isotropically (i.e. equal scaling factor in both x- and y-axis) to a common size (e.g. 128×48 pixels) to facilitate image matching. The warped images can then be matched using either sum of squared differences (SSE) or normalised cross correlation (NCC). The warping of a target image to a canonical pose may be performed by translating each image row horizontally so that the body medial axis aligns with the middle image column. The image is padded with repeated intensities at border if necessary. The left half of image rows below the leg split point may then be translated horizontally so that the left leg medial axis aligns with the left leg axis in the canonical pose (i.e. at 10-degree angle with respect to the body medial axis). Similarly, intensities may be repeated at image border if necessary. The right half of image rows below the leg split point may then be translated horizontally so that the right leg medial axis aligns with the right leg axis in the canonical pose.

INDUSTRIAL APPLICABILITY

The arrangements described are applicable to the computer and data processing industries and particularly for applications in the fields of surveillance and security.

The foregoing describes only some embodiments of the present invention, and modifications and/or changes can be made thereto without departing from the scope and spirit of the invention, the embodiments being illustrative and not restrictive.

The invention claimed is:

1. A method of identifying an object in an image, the method comprising:
   determining at least one feature map for each of a plurality of cells in the image;
   determining, via photometric invariant self-dissimilarity matching, a self-dissimilarity between a first feature map associated with a first one of the cells and a second feature map associated with a second cell, wherein the self-dissimilarity is determined by determining a sum over thresholds of a difference in area between the first feature map and the second feature map;
   forming an appearance signature for the object based on the determined self-dissimilarity;
   determining a distance between the appearance signature of the object in the image and appearance signatures of each of a plurality of further objects; and
   identifying the object in the image based on the determined distances.

2. The method according to claim 1, wherein the sum over thresholds is determined using a thresholded first feature map and a thresholded second feature map.

3. The method according to claim 1, wherein the sum over thresholds of a difference in area between the first feature map and the second feature map is determined as the sum over thresholds for which the first feature map has a larger area than the second feature map.

4. The method according to claim 1, wherein the sum over thresholds of a difference in area between the first feature map and second feature map is determined as the sum over thresholds for which the second feature map has a larger area than the first feature map.

5. The method according to claim 1, wherein the cells are rectangular regions defined at multiple scales and aspect ratios.

6. The method according to claim 1, wherein the feature maps include intensity, chrominance, hue, saturation, opponent colours, image gradients, Gabor filter responses or texture filters.

7. The method according to claim 1, further including determining, for at least one cell, a self-dissimilarity between a determined feature map and a canonical feature map.

8. The method according to claim 7, wherein the canonical feature map has a cumulative distribution corresponding to a step function, with a step at a center of a range of feature values.

9. The method according to claim 1, wherein forming an appearance signature includes applying a soft threshold to determined signed dissimilarities, wherein the soft threshold is applied to the determined signed dissimilarities using the following soft threshold equation:

$$\tilde{s}_i = 1 - \exp(-s_i/\sigma),$$

where each value $s_i$, $i=1, 2, \ldots, 2N$ in the formed appearance signature is replaced with a new value $\tilde{s}_i$, and a strength of the soft threshold is determined or predetermined by the parameter $\sigma$.

10. The method according to claim 1, wherein the photometric invariant self-dissimilarity matching is performed such that relative differences between cells are invariant to photometric change.

11. The method according to claim 1, wherein the first feature map and the second feature map each have a feature distribution that is defined or estimated by at least one of: a normalized histogram of feature values in the respective feature map, Kernal Density Estimation (KDE) based on feature values in the respective feature map, and a Gaussian Mixture Model (GMM) based on pixel values in the respective feature map.

12. The method according to claim 1, further comprising determining a first feature distribution from the first feature map and a second feature distribution from the second feature map.

13. The method according to claim 12, further comprising quantifying or determining a difference between the first feature distribution and the second feature distribution.

14. The method according to claim 13, wherein the quantifying or determining includes using an Earth mover's distance (EMD).

15. The method according to claim 14, further comprising computing or determining a signed EMD between the first feature map and the second feature map.

16. The method according to claim 15, wherein the formation of the appearance signature occurs after the signed EMD is computed or determined.

17. The method according to claim 1, further comprising using a foreground confidence mask to assign to each pixel of the image a value indicating a confidence that the pixel belongs to the object.

18. A system for identifying an object in an image, the system comprising:
   a memory for storing data and a computer program;
   at least one processor coupled to the memory for executing the computer program, the at least one processor operating to:
      determine at least one feature map for each of a plurality of cells in the image;
      determine, via photometric invariant self-dissimilarity matching, a self-dissimilarity between a first feature map associated with a first one of the cells and a second feature map associated with a second cell, wherein the self-dissimilarity is determined by determining a sum over thresholds of a difference in area between the first feature map and the second feature map;
      form an appearance signature for the object based on the determined self-dissimilarity;
      determine a distance between the appearance signature of the object in the image and appearance signatures of each of a plurality of further objects; and
      identify the object in the image based on the determined distances.

19. An apparatus for identifying an object in an image, the apparatus comprising:
   means for determining at least one feature map for each of a plurality of cells in the image;
   means for determining, via photometric invariant self-dissimilarity matching, a self-dissimilarity between a first feature map associated with a first one of the cells and a second feature map associated with a second cell, wherein the self-dissimilarity is determined by determining a sum over thresholds of a difference in area between the first feature map and the second feature map;
   means for forming an appearance signature for the object based on the determined self-dissimilarities;
   means for determining a distance between the appearance signature of the object in the image and appearance signatures of each of a plurality of further objects; and
   means for identifying the object in the image based on the determined distances.

20. A non-transitory computer-readable storage medium storing at least one program that causes a processor to execute a method of identifying an object in an image, the method comprising:
   determining at least one feature map for each of a plurality of cells in the image;
   determining, via photometric invariant self-dissimilarity matching, a self-dissimilarity between a first feature map associated with a first one of the cells and a second feature map associated with a second cell, wherein the self-dissimilarity is determined by determining a sum over thresholds of a difference in area between the first feature map and the second feature map;
   forming an appearance signature for the object based on the determined self-dissimilarity;
   determining a distance between the appearance signature of the object in the image and appearance signatures of each of a plurality of further objects; and
   identifying the object in the image based on the determined distances.

* * * * *